US008018502B2

(12) United States Patent
Shimazaki et al.

(10) Patent No.: US 8,018,502 B2
(45) Date of Patent: Sep. 13, 2011

(54) IMAGE RECORDING DEVICE, IMAGE REPRODUCING DEVICE, RECORDING MEDIUM, AND IMAGE RECORDING METHOD FOR CAPTURING IMAGES AT DIFFERENT FRAMES RATES AND GENERATING TIMESTAMPS FOR PRESENTATION

(75) Inventors: Hiroaki Shimazaki, Osaka (JP); Kenjiro Tsuda, Osaka (JP); Tatsuro Juri, Osaka (JP); Katsuo Saigo, Hyogo (JP); Takashi Masuno, Osaka (JP); Yuki Kobayashi, Osaka (JP); Takuma Chiba, Osaka (JP); Yukinaga Seki, Kyoto (JP)

(73) Assignee: Panasonic Corporation, Osaka (JP)

( * ) Notice: Subject to any disclaimer, the term of this patent is extended or adjusted under 35 U.S.C. 154(b) by 410 days.

(21) Appl. No.: 12/358,480

(22) Filed: Jan. 23, 2009

(65) Prior Publication Data

US 2009/0189996 A1    Jul. 30, 2009

(30) Foreign Application Priority Data

Jan. 25, 2008    (JP) .................................. 2008-015366

(51) Int. Cl.
*H04N 5/76* (2006.01)
*H04N 5/222* (2006.01)

(52) U.S. Cl. ................. 348/231.5; 348/333.05

(58) Field of Classification Search ............... 348/220.1, 348/222.1, 231.99, 231.2, 231.3, 231.5, 231.6, 348/333.01, 333.02, 333.05, 333.11
See application file for complete search history.

(56) References Cited

U.S. PATENT DOCUMENTS

| | | | | |
|---|---|---|---|---|
| 6,297,852 | B1 * | 10/2001 | Laksono et al. | 348/584 |
| 7,676,142 | B1 * | 3/2010 | Hung | 386/233 |
| 2004/0202109 | A1 * | 10/2004 | Akiyama et al. | 370/235 |
| 2004/0268397 | A1 * | 12/2004 | Dunbar et al. | 725/88 |
| 2008/0267588 | A1 | 10/2008 | Iwase et al. | |
| 2008/0273698 | A1 * | 11/2008 | Manders et al. | 380/200 |

FOREIGN PATENT DOCUMENTS

| | | |
|---|---|---|
| JP | 2718409 | 11/1997 |
| JP | 3227393 | 8/2001 |
| JP | 2006-109176 | 4/2006 |
| JP | 2007-104584 | 4/2007 |
| JP | 2007-104615 | 4/2007 |

* cited by examiner

*Primary Examiner* — Nicholas Giles
(74) *Attorney, Agent, or Firm* — Wenderoth, Lind & Ponack, L.L.P.

(57) ABSTRACT

An image recording device includes: a reference clock generation generating a reference clock; a first compression unit generating first compressed image data by compressing a first picture that is included in pictures in the captured image and that is equivalent to image captured at the first frame rate; a second compression unit generating second compressed image data by compressing a second picture that is included in the pictures in the captured image except the first picture; a first timestamp generation unit generating a first timestamp indicating a time for presentation of the first picture with reference to the reference clock; a second timestamp generation unit generating a second timestamp indicating a time for presentation of the second picture with reference to the reference clock; a first assignment unit assigning the first timestamp to the first compressed image data; a second assignment unit assigning the second timestamp to the second compressed image data; and a recording unit recording, to the recording medium, (i) the first compressed image data assigned with the first timestamp and (ii) the second compressed image data assigned with the second timestamp.

16 Claims, 13 Drawing Sheets

FIG. 9

| | Time | STC (27 MHz) | PTS (90 kHz) |
|---|---|---|---|
| 60i (59.94 Hz) 1 Field | 16.68 msec | 4504450.00 | 1501.50 |
| 300p 1 Frame | 3.34 msec | 90090.00 | 300.30 |

IMAGE RECORDING DEVICE, IMAGE REPRODUCING DEVICE, RECORDING MEDIUM, AND IMAGE RECORDING METHOD FOR CAPTURING IMAGES AT DIFFERENT FRAMES RATES AND GENERATING TIMESTAMPS FOR PRESENTATION

BACKGROUND OF THE INVENTION (1) Field of the Invention

The present invention relates to an image recording device, an image reproducing device, a recording medium, an image recording method, and a program, and more particularly to an image recording device that records high-speed captured image to a removable recording medium, the recording medium in which the high-speed captured image are recorded by the image recording device, and an image reproducing device that reproduces the high-speed captured image recorded in the recording medium.

(2) Description of the Related Art

There are known image recording devices, such as recordable DVD camcorders, that generate high-speed captured image having a frame rate higher than 30 frames per second (fps). Slow playback of the high-speed captured image captured at such a high frame rate enables high-accuracy analysis. Therefore, the image recording devices generating high-speed captured image are used in the fields of research and development.

An example of the conventional image recording devices generating high-speed captured image is disclosed in, for example, Patent Reference of Japanese Patent No. 2718409 that changes a size of each of frames in high-speed captured image to a child screen size, then multiplexes a frame to other frame(s) as being divided on a screen, and records the multiplexed data as normal image.

However, the conventional image recording device disclosed in Japanese Patent No. 2718409 has a problem that image quality of each frame is deteriorated because each frame is size-reduced before being recorded. In addition, when the resulting image is reproduced by image reproducing devices not supporting reproduction of high-speed reproduction image, the resulting image is displayed as being divided on a screen. That is, the conventional image recording device disclosed in Japanese Patent No. 2718409 has a problem of failing to ensure compatibility with image reproducing devices having conventional standards which do not support reproduction of high-speed reproduction image.

In the meanwhile, another image recording device is disclosed in, for example, Patent Reference of Japanese Unexamined Patent Application Publication No. 2007-104584 that records, from among frames in high-speed captured image having a frame rate higher than 30 fps, frames equivalent to image having a frame rate of 30 fps to a removable memory, and the remaining frames to a different memory.

This image recording device disclosed in Japanese Unexamined Patent Application Publication No. 2007-104584 does not perform a size reduction of each frame and the like, and therefore prevents the image quality deterioration. Moreover, the image recording device of Japanese Unexamined Patent Application Publication No. 2007-104584 can ensure compatibility with image reproducing devices having conventional standards which do not support reproduction of high-speed reproduction image, by storing frames equivalent to image having a frame rate of 30 fps in high-speed captured image to a memory and other frames to a different memory and then using only the frames equivalent to image having a frame rate of 30 fps.

However, since the frames equivalent to image having a frame rate of 30 fps and other frames are stored separately in respective different memories, this conventional image recording device of Japanese Unexamined Patent Application Publication No. 2007-104584 has a problem of difficulty in managing these frames as high-speed captured image.

Moreover, if high-speed captured image is divided into pieces to be recorded by the image recording device as disclosed in Japanese Unexamined Patent Application Publication No. 2007-104584, an image reproducing device needs to reproduce the high-speed captured image by detecting relationships of reproduction timings among the divided pieces.

SUMMARY OF THE INVENTION

The present invention addresses the above-described problems. It is an object of the present invention to provide: an image recording device capable of ensuring compatibility with image reproducing devices having conventional standards and recording high-speed captured image to be easily managed and to be reproduced by easily detecting relationships of reproduction timings among divided pieces of the high-speed captured image; a recording medium which is capable of ensuring compatibility with image reproducing devices having conventional standards and on which the high-speed captured image to be easily managed and to be reproduced by easily detecting relationships of reproduction timings among divided pieces of the high-speed captured image is recorded; and an image reproducing device that reproduces the high-speed captured image recorded on the recording medium.

In accordance with an aspect of the present invention for achieving the objects, there is provided an image recording device that compresses captured image and records the captured image to a recording medium, the captured image being captured at a second frame rate higher than a first frame rate, and the recording medium being removable from the image recording device, the image recording device including: a reference clock generation unit configured to generate a reference clock; a first compression unit configured to generate first compressed image data by compressing a first picture that is included in pictures in the captured image and that is equivalent to image captured at the first frame rate; a second compression unit configured to generate second compressed image data by compressing a second picture that is included in the pictures in the captured image except the first picture; a first timestamp generation unit configured to generate a first timestamp indicating a time for presentation of the first picture with reference to the reference clock; a second timestamp generation unit configured to generate a second timestamp indicating a time for presentation of the second picture with reference to the reference clock; a first assignment unit configured to assign the first timestamp to the first compressed image data; a second assignment unit configured to assign the second timestamp to the second compressed image data; and a recording unit configured to record, to the recording medium, (i) the first compressed image data assigned with the first timestamp by the first assignment unit and (ii) the second compressed image data assigned with the second timestamp by the second assignment unit.

With the above structure, (i) the first compressed image data generated by compressing image data having the first frame rate and (ii) the second compressed image data generated by compressing image data that is included in the image data captured at the second frame rate except image data equivalent to image captured at the first frame rate, are recorded to the same recording medium. Thereby, when an image reproducing device having a conventional standard that does not support reproduction of the high-speed captured image reproduces a recording medium on which the high-speed captured image is recorded by the image recording device according to the present invention, the image reproducing device having the conventional standard can reproduce the image having the first frame rate by decompressing and reproducing the first compressed image data. As a result, the image recording device according to the present invention can ensure compatibility with the image reproducing device having the conventional standard.

Furthermore, when an image reproducing device that supports reproduction of high-speed captured image reproduces a recording medium on which the high-speed captured image is recorded by the image recording device according to the present invention, the supporting image reproducing device can reconstruct and reproduce the high-speed captured image by decompressing the first compressed image data and the second compressed image data and synthesizing the first compressed image data with the second compressed image data.

In addition, the image recording device according to the present invention records, on the same recording medium, both of (i) the first compressed image data in conformity to a conventional standard and (ii) the second compressed image data (high-speed image sub-data) to be used to reproduce the high-speed captured image. Thereby, the high-speed captured image recorded by the image recording device according to the present invention can be managed more easily than high-speed captured image which is divided to (i) the first compressed image data in conformity to a conventional standard and (ii) the second compressed image data to be used to reproduce the high-speed captured image and then recorded separately to different recording mediums. That is, the image recording device according to the present invention can record high-speed captured image to be easily managed.

Moreover, before recording the high-speed captured image to the recording medium, the image recording device according to the present invention assigns the first timestamps to the first pictures, and the second timestamps to the second pictures. Here, the first pictures and the second pictures are generated by dividing the same high-speed captured image, and the first timestamps and the second timestamps are generated using the same reference clock. Thereby, when high-speed captured image recorded by the image recording device according to the present invention to a recording medium is reproduced by an image reproducing device supporting reproduction of high-speed captured image, the supporting image reproducing device can easily detect a relationship of reproduction timings between (i) the first compressed image data in conformity to a conventional standard and (ii) the second compressed image data used to reproduce the high-speed captured image, using the first timestamp and the second timestamp.

It is also possible that the first timestamp generation unit is configured to generate a plurality of first timestamps including the first timestamp for a plurality of first pictures including the first picture which are consecutive, the plurality of first timestamps being generated at regular intervals, and the second timestamp generation unit is configured to generate a plurality of second timestamps including the second timestamp for a plurality of second pictures including the second picture which are consecutive, the plurality of second timestamps being generated at irregular intervals.

It is further possible that the first timestamp generation unit and the second timestamp generation unit are configured to generate the plurality of first timestamps and the plurality of second timestamps, respectively, so that the plurality of first timestamps and the plurality of second timestamps which are consecutive are arranged at regular intervals in an order of time.

It is still further possible that the recording medium is initialized to have a file system, and the recording unit is configured to (i) create a first folder and a second folder in the file system, (ii-1) record the first compressed image data and first control information for reproducing the first compressed image data in association with the first folder, and (ii-2) record the second compressed image data in association with the second folder.

With the above structure, the image recording device according to the present invention records, in a file system structured in the same recording medium, both of (i) image data in conformity to a conventional standard and (ii) sub-data to be used to reproduce the high-speed captured image are recorded. Thereby, the high-speed captured image recorded by the image recording device according to the present invention can be managed more easily than high-speed captured image which is divided to (i) image data in conformity to a conventional standard and (ii) sub-data to be used to reproduce the high-speed captured image and then recorded separately to different recording mediums. That is, the image recording device according to the present invention can record high-speed captured image to be easily managed.

It is still further possible that an image reproducing device that reproduces captured image recorded on a recording medium, the captured image being captured at a second frame rate higher than a first frame rate, and the recording medium being removable from the image reproducing device, the image reproducing device including: a readout unit configured to read out first compressed image data and second compressed image data to be recorded to the recording medium, the first compressed image data being generated by compressing a first picture that is included in pictures in the captured image and that is equivalent to image captured at the first frame rate, and the second compressed image being generated by compressing a second picture that is included in the pictures in the captured image except the first picture; a first decompression unit configured to reconstruct the first picture by decompressing the first compressed image data; a second decompression unit configured to reconstruct the second picture by decompressing the second compressed image data; a first timestamp obtainment unit configured to obtain a first timestamp assigned to the first compressed image data to indicate a time for presentation of the first picture; a second timestamp obtainment unit configured to obtain a second timestamp assigned to the second compressed image data to indicate a time for presentation of the second picture; and a reproduction unit configured to reproduce the first picture and the second picture in an order decided based on the first timestamp and the second timestamp.

With the above structure, the image reproducing device according to the present invention can reconstruct the high-speed captured image from the first compressed image data and the second compressed image data which are recorded on the recording medium, and perform smooth slow playback of the reconstructed image.

In addition, the image reproducing device according to the present invention can reproduce the high-speed captured image by outputting the first pictures and the second pictures in an order decided based on the values of the first timestamps and the second timestamps which are assigned to the first pictures and the second pictures, respectively, with reference to only these timestamps. As a result, the image recording device according to the present invention can easily detect a relationship of reproduction timings between (i) the first compressed image data in conformity to a conventional standard and (ii) the second compressed image data to be used to reproduce the high-speed captured image.

It is still further possible that the image reproducing device further includes a reference clock counter unit configured to count a reference clock based on information of the reference clock, the information being added to the first compressed image data, wherein the reproduction unit is configured to reproduce (i) the first picture at a timing where the first timestamp corresponds to a corresponding timing of the reference clock, and (ii) the second picture at a timing where the second timestamp corresponds to a corresponding timing of the reference clock.

With the above structure, the image reproducing device according to the present invention can reproduce high-speed reproduction image at timings synchronized with the same reference clock as used in generating captured data of the high-speed reproduction image, even if a speed of reading out data from the recording medium by the readout unit cannot be controlled being cooperated with the processing of a circuit in which the processing of and after the first decompression unit and the second decompression unit are implemented. For example, when the data read out by the readout unit is transferred between devices and then decompressed by the first decompression unit and the second decompression unit, it is impossible to control the speed of reading out the data by the readout unit to be cooperated with the processing of the circuit in which the processing of and after the first decompression unit and the second decompression unit are implemented. However, even in the above situation, if the first decompression unit and the second decompression unit store, to buffers, divided two pieces of data which have been generated by diving the captured data of the high-speed reproduction image and are provided from the readout unit, and then reproduce the divided pieces of data in synchronization with the same reference clock, it is possible to smoothly display the divided pieces of data by detecting a relationship of reproduction timings between the divided pieces of data.

It is still further possible that the image reproducing device has a first mode and a second mode, the first mode being used for reproducing, at the first frame rate, captured image captured at the first frame rate and recorded to the recording medium, and the second mode being used for reproducing, at a third frame rate slower than the second frame rate, the captured image captured at the second frame rate and recorded to the recording medium, and the reference clock counter unit is configured to (i), at the first mode, count the reference clock having a first frequency based on the information of the reference clock, and (ii), at the second mode, count the reference clock having a second frequency lower than the first frequency based on the information of the reference clock.

With the above structure, the image reproducing device according to the present invention can reconstruct the high-speed captured image from the first compressed image data and the lo second compressed image data which are recorded on the recording medium, and perform smooth slow playback of the reconstructed image.

It is still further possible that the image reproducing device has a first mode and a second mode, the first mode being used for reproducing, at the first frame rate, captured image captured at the first frame rate and recorded to the recording medium, and the second mode being used for reproducing, at a third frame rate slower than the second frame rate, the captured image captured at the second frame rate and recorded to the recording medium, and the reproduction unit is configured to (i) sort, at the second mode, the first picture and the second picture in an order decided based on the first timestamp and the second timestamp and (ii) sequentially reproduce the first picture and the second picture in the order at timings indicated by pulse signals provided from outside of the image reproducing device.

With the above embodiment, the image reproducing device according to the present invention does not need to detect at a timing where each of the first timestamp and the second timestamp corresponds to a corresponding timing of the reference clock. As a result, a hardware structure of the image reproducing device can be simplified.

It is still further possible that the first timestamp and the second timestamp are generated with reference to a same reference clock.

In accordance with still another aspect of the present invention, there is provided a recording medium on which captured image is recorded, the captured image being captured at a second frame rate higher than a first frame rate, and the recording medium being removable from an image recording device and an image reproducing device, the recording medium including: first compressed image data generated by compressing a first picture that is included in pictures in the captured image and that is equivalent to image captured at the first frame rate; and second compressed image data generated by compressing a second picture that is included in the pictures in the captured image except the first picture, wherein the first compressed image data is assigned with a first timestamp indicating a time for presentation of the first picture with reference to a reference clock, and the second compressed image data is assigned with a second timestamp indicating a time for presentation of the second picture with reference to the reference clock.

With the above structure, on the recording medium according to the present invention, there are recorded (i) the first compressed image data generated by compressing image data having at the first frame rate and (ii) the second compressed image data generated by compressing image data that is included in the image data captured at the second frame rate except image data equivalent to image captured at the first frame rate. Thereby, when an image reproducing device having a conventional standard that does not support reproduction of high-speed captured image reproduces the recording medium according to the present invention, the image reproducing device having the conventional standard can reproduce the image having the first frame rate by reproducing the first compressed image data. As a result, the recording medium according to the present invention can ensure compatibility with the image reproducing device having the conventional standard.

Furthermore, when an image reproducing device that supports reproduction of high-speed captured image reproduces the recording medium according to the present invention, the image reproducing device can reconstruct and reproduce the high-speed captured image by decompressing the first compressed image data and the second compressed image data and synthesizing the first compressed image data with the second compressed image data.

In addition, on the recording medium according to the present invention, there are recorded both of (i) the first compressed image data in conformity to a conventional standard and (ii) the second compressed image data to be used to reproduce the high-speed captured image. Thereby, the high-speed captured image recorded on the recording medium according to the present invention can be managed more easily than high-speed captured image which is divided to (i) the first compressed image data in conformity to a conventional standard and (ii) the second compressed image data to be used to reproduce the high-speed captured image and then recorded separately to different recording mediums.

Moreover, on the recording medium according to the present invention, there are recorded the first pictures and the second pictures as image data assigned with the first timestamps and the second timestamps, respectively, which are generated using the same reference clock. Here, the first pictures and the second pictures are generated by dividing the same high-speed captured image. Thereby, when high-speed captured image recorded on the recording medium according to the present invention is reproduced by an image reproducing device supporting reproduction of high-speed captured image, the image reproducing device can easily detect a relationship of reproduction timings between (i) the first compressed image data in conformity to a conventional standard and (ii) the second compressed image data used to reproduce the high-speed captured image.

It is also possible that a plurality of first timestamps including the first timestamp are generated at regular intervals, the plurality of first timestamps being assigned to a plurality of first pictures including the first picture which are consecutive, and a plurality of second timestamps including the second timestamp are generated at irregular intervals, the plurality of second timestamps being assigned to a plurality of second pictures including the second picture which are consecutive.

It is further possible that the plurality of first timestamps and the plurality of second timestamps are arranged at regular intervals in an order of time.

It is still further possible that the recording medium is initialized to have a file system, a first folder and a second folder are created in the file system, the first compressed image data and first control information are recorded in association with the first folder, the first control information being used for reproducing the first compressed image data, and the second compressed image data is recorded in association with the second folder.

With the above structure, on the recording medium according to the present invention, both of (i) image data in conformity to a conventional standard and (ii) sub-data used for reproducing the high-speed captured image are recorded in a single file system. Thereby, the high-speed captured image recorded on the recording medium according to the present invention can be managed more easily than high-speed captured image which is divided to (i) image data in conformity to a conventional standard and (ii) sub-data to be used for reproducing the high-speed captured image and then recorded separately to different recording mediums.

In accordance with still another aspect of the present invention, there is provided an image recording method used in an image recording device that compresses captured image and records the captured image to a recording medium, the captured image being captured at a second frame rate higher than a first frame rate, and the recording medium being removable from the image recording device, the image recording method including: generating a reference clock; generating first compressed image data by compressing a first picture that is included in pictures in the captured image and that is equivalent to image captured at the first frame rate; generating second compressed image data by compressing a second picture that is included in the pictures in the captured image except the first picture; generating a first timestamp indicating a time for presentation of the first picture with reference to the reference clock; generating a second timestamp indicating a time for presentation of the second picture with reference to the reference clock; assigning the first timestamp to the first compressed image data; assigning the second timestamp to the second compressed image data; and recording, to the recording medium, (i) the first compressed image data assigned with the first timestamp by the assigning of the first timestamp and (ii) the second compressed image data assigned with the second timestamp by the assigning of the second timestamp.

With the above structure, (i) the first compressed image data generated by compressing image data having at the first frame rate and (ii) the second compressed image data generated by compressing image data that is included in the image data captured at the second frame rate except image data equivalent to image captured at the first frame rate are recorded to the same recording medium. Thereby, when an image reproducing device having a conventional standard that does not support reproduction of the high-speed captured image reproduces a recording medium on which the high-speed captured image is recorded by the image recording method according to the present invention, the image reproducing device having the conventional standard can reproduce the image having the first frame rate by reproducing the image data. As a result, the image recording method according to the present invention can ensure compatibility with the image reproducing device having the conventional standard.

Furthermore, when an image reproducing device that supports reproduction of high-speed captured image reproduces a recording medium on which the high-speed captured image is recorded by the image recording method according to the present invention, the image reproducing device can reconstruct and reproduce the high-speed captured image by decompressing and synthesizing the first compressed image data and the second compressed image data.

In addition, by the image recording method according to the present invention records, both of (i) the first compressed image data in conformity to a conventional standard and (ii) the second compressed image data to be used to reproduce the high-speed captured image are recorded on the same recording medium. Thereby, the high-speed captured image recorded by the image recording method according to the present invention can be managed more easily than high-speed captured image which is divided to (i) the first compressed image data in conformity to a conventional standard and (ii) the second compressed image data to be used to reproduce the high-speed captured image and then recorded separately to different recording mediums. That is, the image recording method according to the present invention can record high-speed captured image to be easily managed.

Moreover, by the image recording method according to the present invention, before recording the high-speed captured image to the recording medium, the first timestamps and the second timestamps which are generated using the same reference clock are assigned to the first pictures and the second pictures, respectively. Here, the first pictures and the second pictures are generated by dividing the same high-speed captured image. Thereby, when high-speed captured image recorded to a recording medium by the image recording method according to the present invention is reproduced by an image reproducing device supporting reproduction of high-speed captured image, the image reproducing device can easily detect relationships of reproduction timings between (i) the first compressed image data in conformity to a conventional standard and (ii) the second compressed image data used to reproduce the high-speed captured image, using the first timestamps and the second timestamps.

It should be noted that the present invention can be implemented not only as the image recording device and the image reproducing device including the above characteristic units, but also as: an image recording method and an image reproducing method including steps performed by the characteristic units of the image recording device and the image reproducing device: a program causing a computer to execute the characteristic steps; and the like. Of course, the program can be distributed by a recording medium such as a Compact Disc-Read Only Memory (CD-ROM) or by a transmission medium such as the Internet.

Furthermore, the present invention can be implemented as a camera in which the above-described image recording device is embedded.

Accordingly, the present invention can provide an image recording device capable of ensuring compatibility with image reproducing devices having conventional standards and recording high-speed captured image to be easily managed and to be reproduced by easily detecting relationships of reproduction timings among divided pieces of the high-speed captured image. Furthermore, the present invention can provide a recording medium on which high-speed captured image that can ensure compatibility with image reproducing devices having conventional standards and that can be easily managed and can be reproduced by easily detecting relationships of reproduction timings among divided pieces of the high-speed captured image is recorded. Still further, the present invention can provide an image reproducing device that reproduces the high-speed captured image recorded on the above recording medium.

FURTHER INFORMATION ABOUT TECHNICAL BACKGROUND TO THIS APPLICATION

The disclosure of Japanese Patent Application No. 2008-015366 filed on Jan. 25, 2008 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 9 is a table showing relationships of a field time, a STC, and a PTS between signal 60$i$ and signal 300$p$ according to the embodiment of the present invention;

DESCRIPTION OF THE PREFERRED EMBODIMENT(S)

The following describes an image recording/reproducing device according to an embodiment of the present invention with reference to the drawings.

An image recording/reproducing device according to the embodiment of the present invention records image equivalent to image having a frame rate of 30 fps included in the high-speed captured image to a folder having a structure having compatibility with a conventional standard, and records the other image included in the high-speed captured image to a different folder. Thereby, the image recording/reproducing device according to the embodiment of the present invention can ensure compatibility with image reproducing devices having the conventional standard and can record high-speed captured image to be easily managed.

Furthermore, the image recording/reproducing device according to the embodiment of the present invention assigns timestamps, which are generated using the same reference clock, to (i) the image equivalent to image having a frame rate of 30 fps included in the high-speed captured image and to (ii) the other image included in the high-speed captured image. Thereby, the image recording/reproducing device according to the embodiment of the present invention can record high-speed captured image, so that a relationship in reproduction timings between the above divided pieces of the high-speed captured image can be easily detected.

Figure 1:
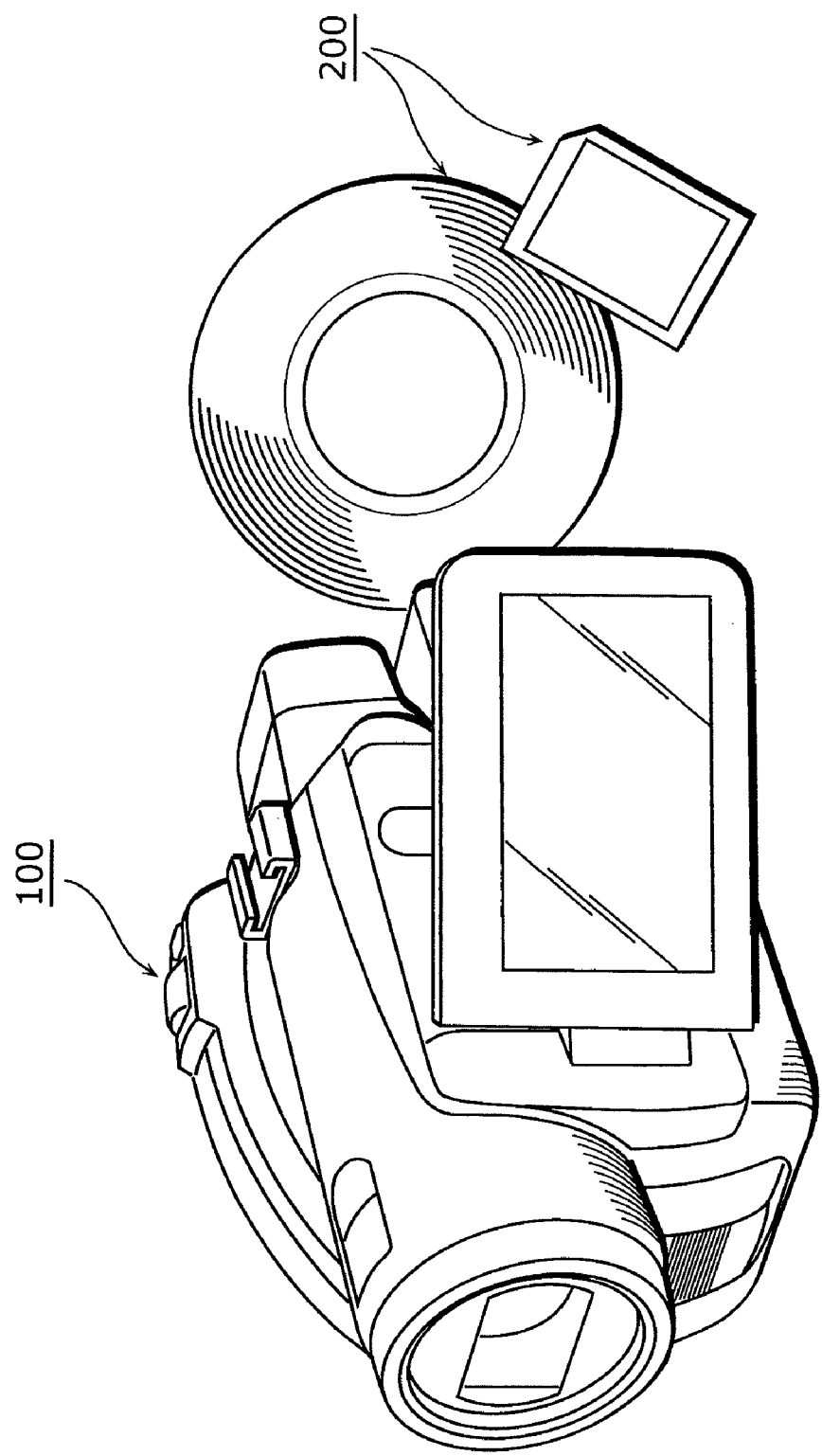
FIG. 1 is a perspective external view of an image recording/reproducing device according to an embodiment of the present invention.

FIG. 1 is a perspective external view of the image recording/reproducing device according to an embodiment of the present invention. As shown in FIG. 1, the image recording/reproducing device 100 is a digital video camera, for example. The image recording/reproducing device 100 has a function of serving as an image recording device that compresses generated high-speed captured image and records the generated high-speed captured image to a recording medium 200. In addition, the image recording/reproducing device 100 has another function of serving as an image reproducing device that reproduces the high-speed captured image recorded on the recording medium 200.

The recording medium 200 is removable from the image recording/reproducing device 100. Examples of the recording medium 200 are a semiconductor memory, an optical disk, and the like. The recording medium 200 is initialized by at least one file system.

The image recording/reproducing device 100 can switch between (i) a normal capturing mode for capturing an object at a frame rate of 30 fps and (ii) a high-speed capturing mode for capturing an object at a frame rate of 300 fields per second. Further, the image recording/reproducing device 100 can switch between (i) a normal reproduction mode for reproducing a part of the image data captured at the high-speed capturing mode which is equivalent to image having a frame rate of 30 fps and (ii) a high-speed reproduction mode for performing slow playback of the image data captured at the high-speed capturing mode. Here, the image recording/reproducing device 100 can reproduce, at a frame rate of 30 fps, the image data captured at the normal capturing mode.

Figure 2:
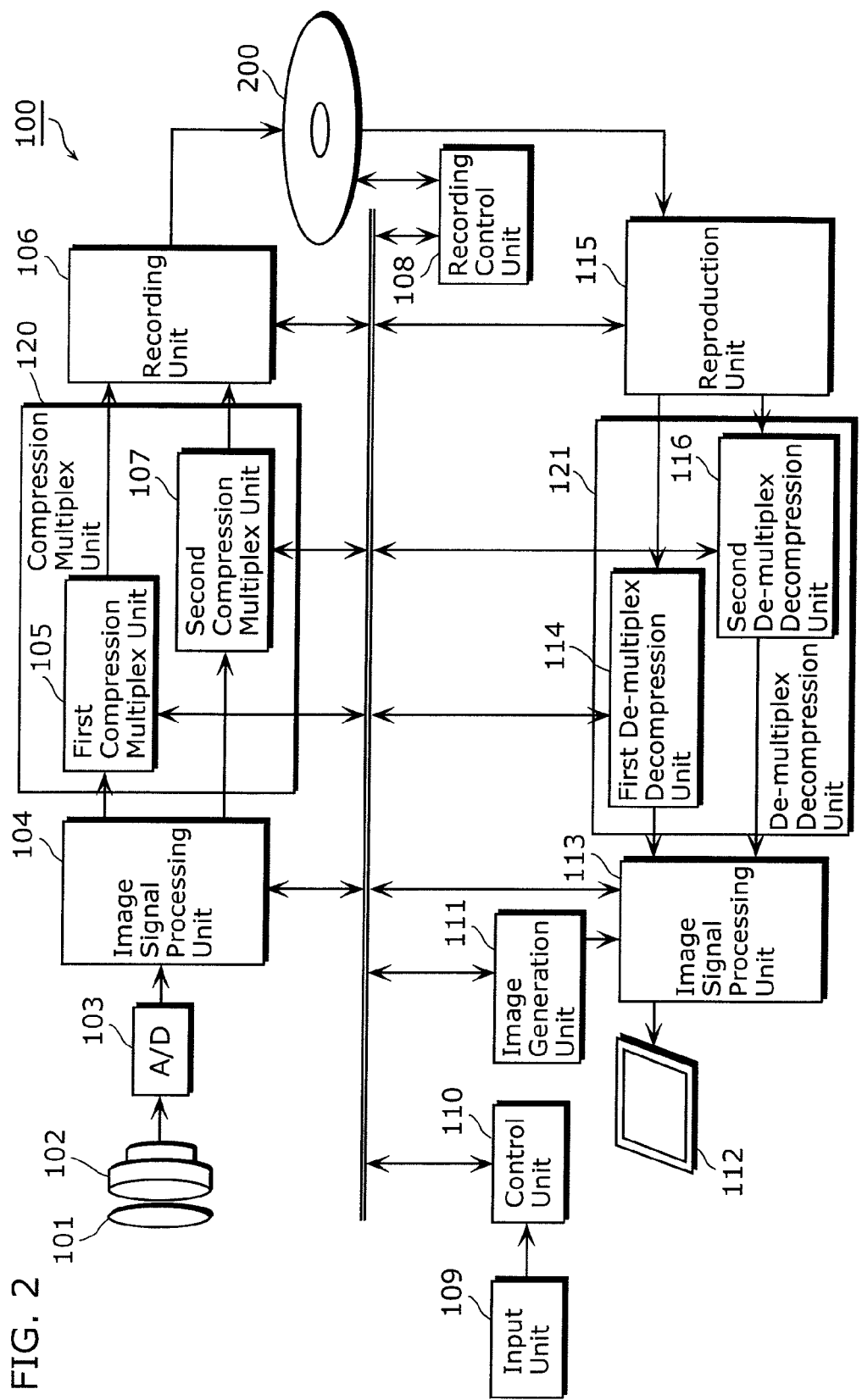
FIG. 2 is a diagram showing a hardware structure of the image recording/reproducing device according to the embodiment of the present invention.

FIG. 2 is a diagram showing a hardware structure of the image recording/reproducing device 100 according to the embodiment of the present invention. As shown in FIG. 2, the image recording/reproducing device 100 includes a lens group 101, an imaging unit 102, an A/D conversion unit 103, an image signal processing unit 104, a compression multiplex unit 120, a recording unit 106, a recording control unit 108, an input unit 109, a control unit 110, an image generation unit 111, a display unit 112, an image signal processing unit 113, a de-multiplex decompression unit 121, and an reproduction unit 115.

The compression multiplex unit 120 includes a first compression multiplex unit 105 and a second compression multiplex unit 107.

The de-multiplex decompression unit 121 includes a first de-multiplex decompression unit 114 and a second de-multiplex decompression unit 116.

The lens group 101 includes a plurality of optical lenses. The lens group 101 collects light on the imaging unit 102.

The imaging unit 102 includes imaging elements and the like. The imaging unit 102 images light received via the lens group 101. In more detail, the imaging unit 102 converts the received light signals to analog signals (electric signals) and provides the analog signals to the A/D conversion unit 103.

The A/D conversion unit 103 converts the analog signals received from the imaging unit 102 to digital signals. The A/D conversion unit 103 provides the resulting digital signals to the image signal processing unit 104.

The image signal processing unit 104 performs image signal processing, such as noise cancellation and image quality adjustment, on the digital signals provided from the A/D conversion unit 103 in order to generate image signals. At the normal capturing mode, the image signal processing unit 104 performs image signal processing on the digital signals to generate normal captured image signals having a frame rate of 30 fps and provides the generated signals to the first compression multiplex unit 105. On the other hand, at the high-speed capturing mode, the image signal processing unit 104 performs image signal processing on the digital signals to generate high-speed captured image signals having a frame rate of 300 fields per second. From among the high-speed captured image signals, the image signal processing unit 104 provides image signals of frames equivalent to image having a frame rate of 30 fps to the first compression multiplex unit 105, and provides image signals of other frames to the second compression multiplex unit 107.

Using a coding method such as MPEG-2 or H.264, the first compression multiplex unit 105 compresses and multiplexes the image signals captured at a frame rate of 30 fps which are provided from the image signal processing unit 104. The first compression multiplex unit 105 provides, as a normal content, the generated compressed image data to the recording unit 106.

Using a coding method such as MPEG-2 or H.264, the second compression multiplex unit 107 compresses and multiplexes the image signals of the other frames except the frames equivalent to image having a frame rate of 30 fps which are provided from the image signal processing unit 104. The second compression multiplex unit 107 provides, as high-speed image sub-data, the generated compressed image data to the recording unit 106.

Figure 3:
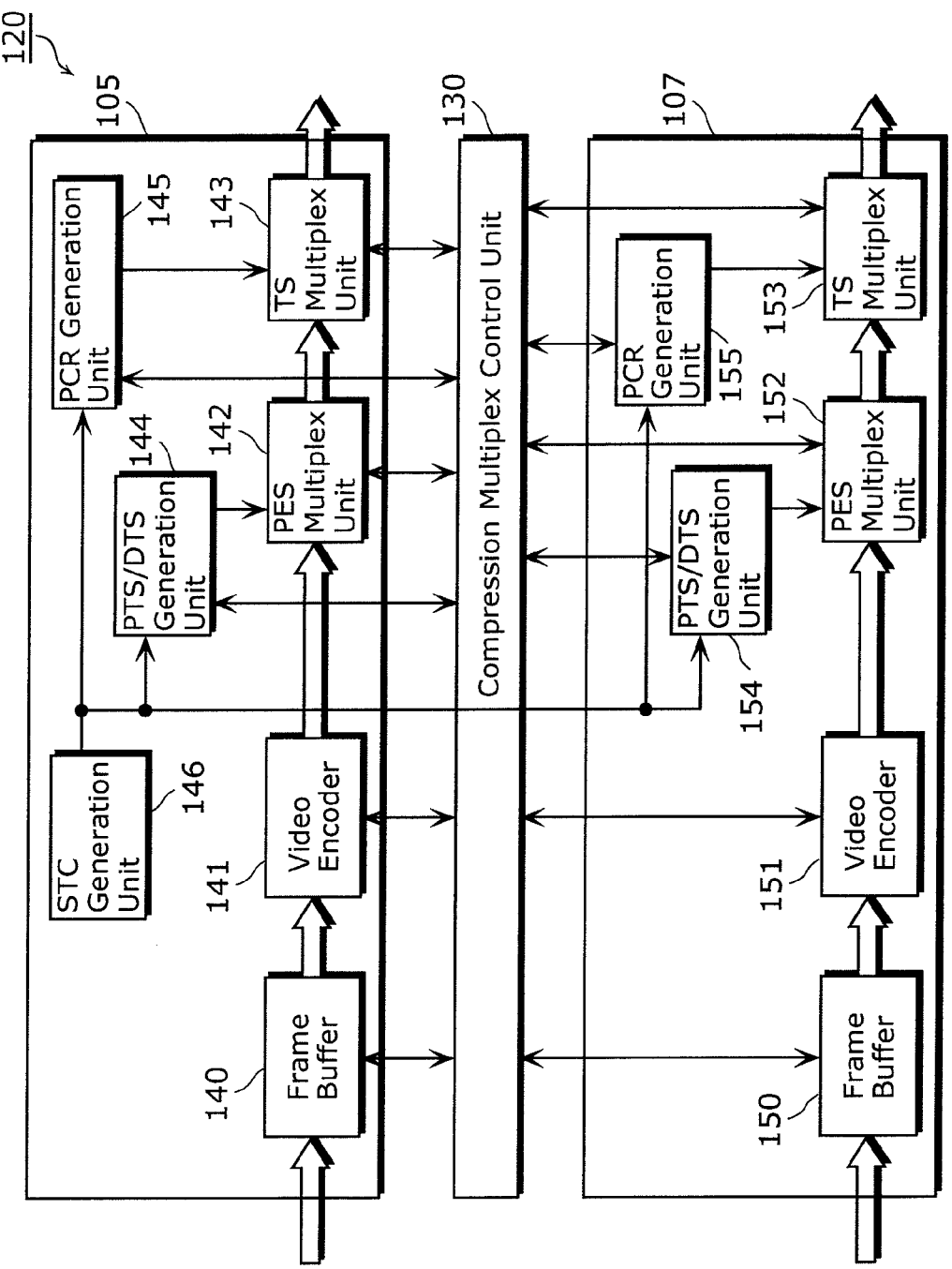
FIG. 3 is a block diagram showing a structure of a compression multiplex unit according to the embodiment of the present invention.

FIG. 3 is a block diagram showing a structure of the compression multiplex unit 120. As shown in FIG. 3, the compression multiplex unit 120 further includes a compression multiplex control unit 130.

The compression multiplex control unit 130 controls the first compression multiplex unit 105 and the second compression multiplex unit 107 to perform compression processing and multiplex processing.

In this embodiment, each of the first compression multiplex unit 105 and the second compression multiplex unit 107 multiplexes image signals to have a form of a Transport Stream (TS) according to MPEG-2 standard as a multiplex method.

The first compression multiplex unit 105 includes a frame buffer 140, a video encoder 141, a PES multiplex unit 142, a TS multiplex unit 143, a PTS/DTS generation unit 144, a PCR generation unit 145, and a STC generation unit 146.

The frame buffer 140 holds image signals of the frames equivalent to image having a frame rate of 30 fps which are provided from the image signal processing unit 104.

The video encoder 141 reads out the image signals from the frame buffer 140 and compresses the readout image signals to generate an Elementary Stream (ES). The video encoder 141 provides the generated ES to the PES multiplex unit 142.

The STC generation unit 146 generates (counts) a System Time Clock (STC) as a reference clock. The STC is synchronization signals based on which a timestamp (namely, time management information) is generated to indicate a corresponding timing in the signals. The STC generation unit 146 provides the generated STC to the PTS/DTS generation units 144 and 154 and the PCR generation units 145 and 155.

With reference to the STC counted by the STC generation unit 146, the PTS/DTS generation unit 144 generates a Presentation TimeStamp (PTS) and a Decoding TimeStamp (DTS) to correspond to respective corresponding timings of the STC, for each of pictures (frames or fields) included in the ES generated by the video encoder 141. The PTS is information indicating a time for presentation (reproduction) of the corresponding picture. The DTS is information indicating a timing of starting decoding of the corresponding picture. The PTS/DTS generation unit 144 provides the generated PTSs and DTSs of the pictures to the PES multiplex unit 142.

The PES multiplex unit 142 multiplexes the PTSs and DTSs generated by the PTS/DTS generation unit 144 to the ES generated by the video encoder 141, thereby generating a Packetized Elementary Stream (PES). The PES multiplex unit 142 provides the generated PES to the TS multiplex unit 143. This means that the PES multiplex unit 142 assigns the PTSs and the DTSs to the ES.

The PCR generation unit 145 generates a Program Clock Reference (PCR) that is reference information of timings at which the same STC are re-generated (re-counted), and then provides the generated PCR to the TS multiplex unit 143.

The TS multiplex unit 143 packetizes the PES generated by the PES multiplex unit 142 into TS packets. When generating the TS packets, the TS multiplex unit 143 multiplexes the PES with the PCR generated by the PCR generation unit 145. The TS multiplex unit 143 provides the generated TS to the recording unit 106. This means that the TS multiplex unit 143 assigns the PCR to the PES.

The second compression multiplex unit 107 includes a frame buffer 150, a video encoder 151, a PES multiplex unit 152, a TS multiplex unit 153, a PTS/DTS generation unit 154, and a PCR generation unit 155. Here, a structure of the second compression multiplex unit 107 differs from the structure of the first compression multiplex unit 105 in eliminating the STC generation unit 146.

The frame buffer 150 holds image signals of the other frames except the frames equivalent to image having a frame rate of 30 fps which are provided from the image signal processing unit 104.

The video encoder 151 reads out the image signals from the frame buffer 150 and compresses the readout image signals to generate an ES. The video encoder 151 provides the generated ES to the PES multiplex unit 152.

With reference to the STC counted by the STC generation unit 146, the PTS/DTS generation unit 154 generates a PTS and a DTS in association with respective timings of the STC, for each of the pictures included in the ES generated by the video encoder 151. The PTS/DTS generation unit 154 provides the generated PDSs and DTSs of the pictures to the PES multiplex unit 152.

The PES multiplex unit 152 multiplexes the PTSs and DTSs generated by the PTS/DTS generation unit 154 to the ES generated by the video encoder 151, thereby generating a PES. The PES multiplex unit 152 provides the generated PES to the TS multiplex unit 153. This means that the PES multiplex unit 152 assigns the PTSs and the DTSs to the ES.

The PCR generation unit 155 generates a PCR to be used as a reference of timings of re-generation (re-count) of the same STC, and provides the generated PCR to the TS multiplex unit 153.

The TS multiplex unit 153 packetizes the PES generated by the PES multiplex unit 152 into TS packets. When generating the TS packets, the TS multiplex unit 153 multiplexes the PES with the PCR generated by the PCR generation unit 155. The TS multiplex unit 153 provides the generated TS to the recording unit 106. This means that the TS multiplex unit 153 assigns the PCR to the PES.

Figure 4:
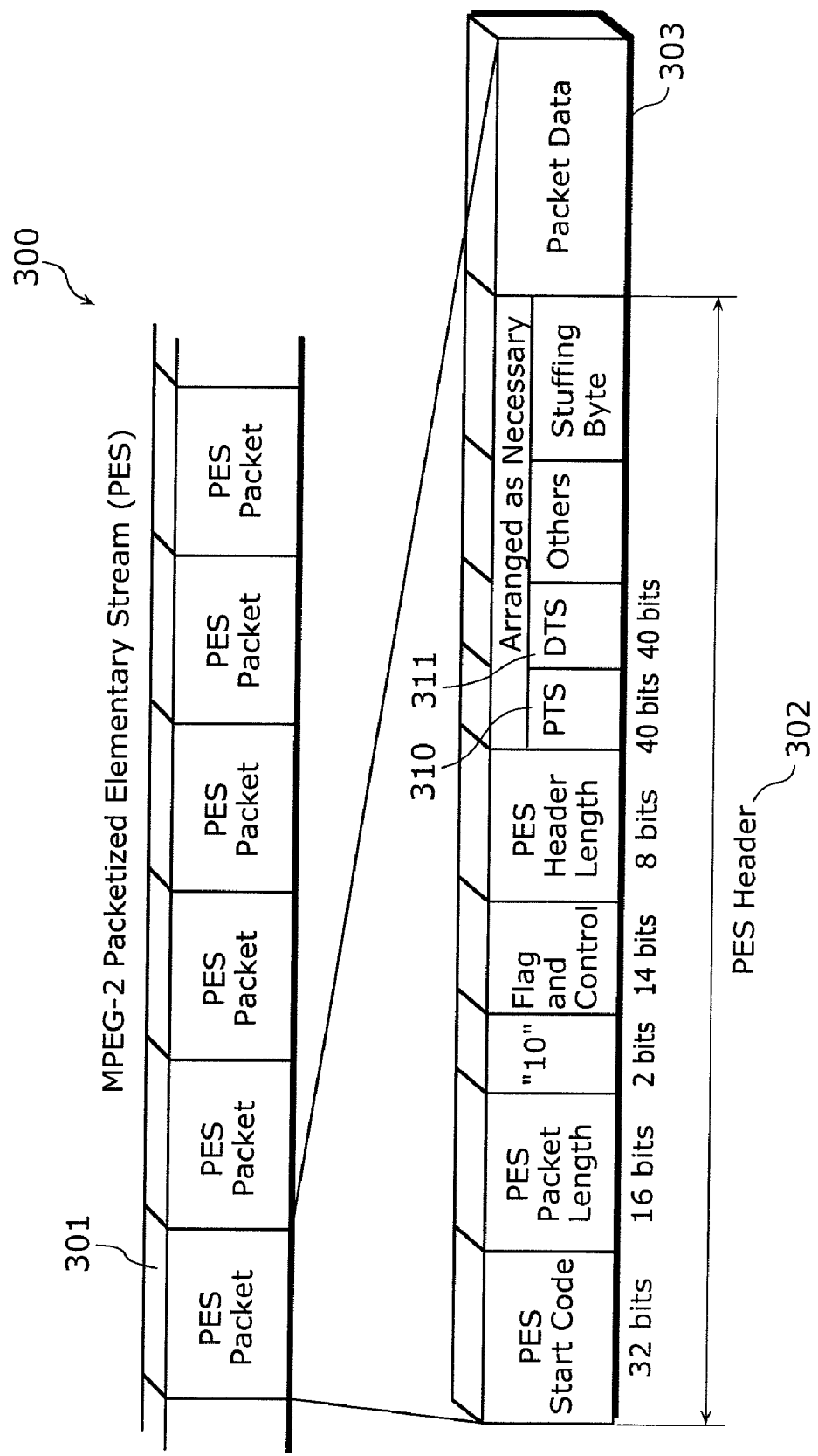
FIG. 4 is a diagram showing an example of a structure of a Packetized Elementary Stream (PES) according to the embodiment of the present invention.

FIG. 4 is a diagram showing an example of a structure of the PES generated by the PES multiplex unit 142 or 152.

A PES 300 shown in FIG. 4 includes a plurality of PES packets 301. Each of the PES packets 301 as image data has a variable length.

Each PES packet 301 includes a PES header 302 and packet data 303.

The PES header 302 includes a PES start code, a PES packet length, a PES header length, a PTS 310, a DTS 311, and the like.

The packet data 303 included in each PES packet 301 is data related to a corresponding picture included in the ES.

The DTS 311 indicates a timing of starting decoding of the data (hereinafter, referred to as "picture data") which is included in the packet data 303 related to the corresponding picture in the ES. The PTS 310 indicates a time for presentation of the picture data which has been decoded. The PTS 310 and the DTS 311 are generated by the PTS/DTS generation unit 144. When reproducing the picture data, a unit performing the reproduction (the de-multiplex decompression unit 121 in the embodiment) obtains the PTS 310 and the DTS 311 from the PES packet 301. Using the obtained PTS 310 and DTS 311, the unit performing the reproduction controls a timing of decoding the picture data and a timing of displaying the picture data.

Figure 5:
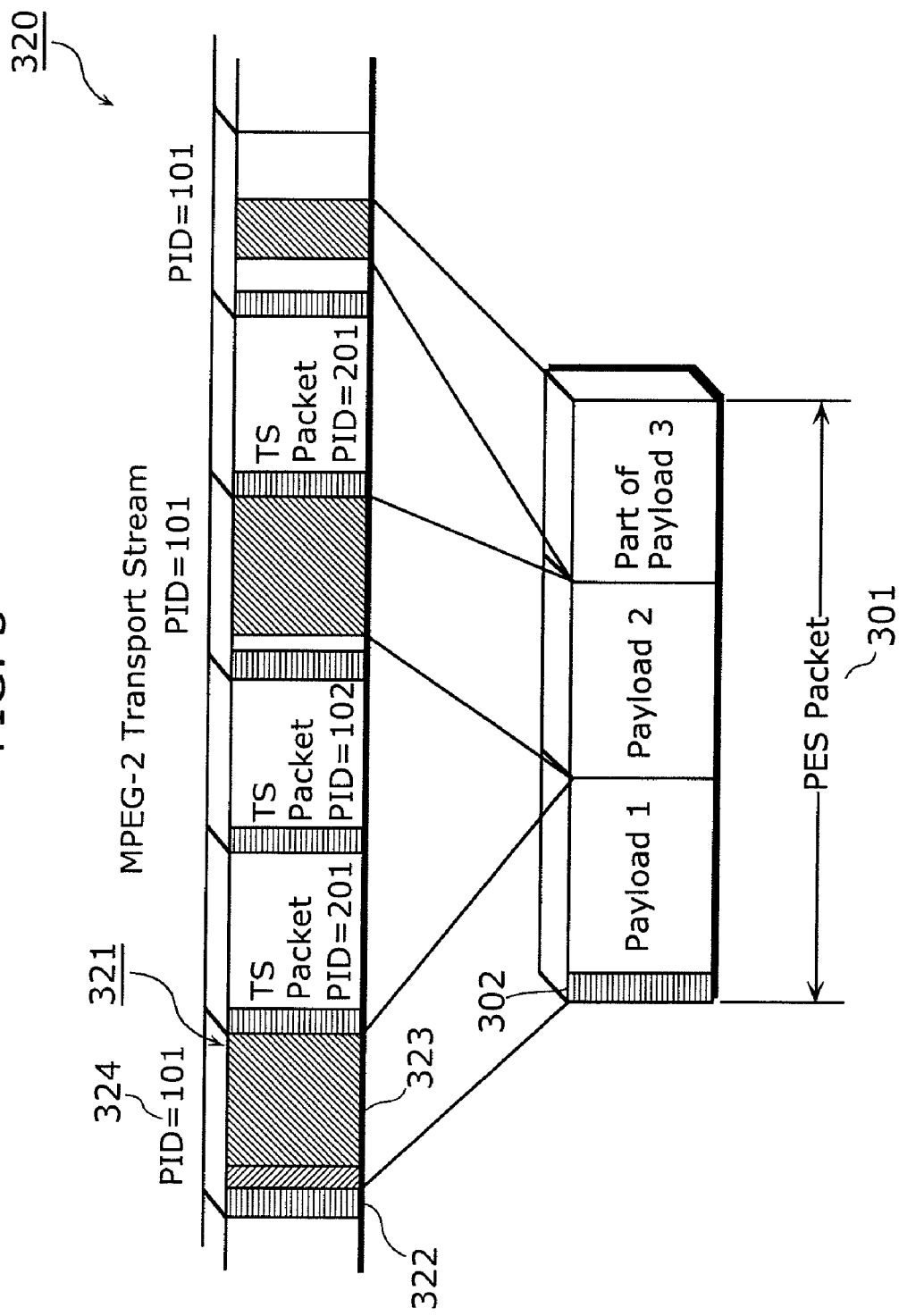
FIG. 5 is a diagram showing an example of a structure of a Transport Stream (TS) according to the embodiment of the present invention.

FIG. 5 is a diagram showing an example of a structure of the TS generated by the TS multiplex unit 143 or 153.

As shown in FIG. 5, a TS 320 includes a plurality of TS packets 321.

Each of the TS packets 321 has a fixed length. Each TS packet 321 includes a TS header 322 and a payload 323.

In the payload 323, image data, audio data, or the like are stored.

The TS header 322 is placed at the beginning of the TS packet 321. In the TS header 322, Packet Identification Data (PID) 324 indicating a kind of the packet is multiplexed. A value of the PID 324 is fixed depending on the content of the payload 323 which is lo image data, audio data, or the like. In this embodiment, the PCR also has a fixed PID value and is transmitted in a TS packet 321 different from the packets regarding other data such as image data, audio data, or the like.

The PES packet 301 included in the PES 300 generated by the PES multiplex unit 142 is divided to be payloads 323 of a plurality of TS packets 321, depending on sizes of the payloads 323.

To the recording medium 200, the recording unit 106 records (i) a normal content that is the TS generated by the TS multiplex unit 143 in the first compression multiplex unit 105 and (ii) high-speed image sub-data that is the TS generated by the TS multiplex unit 153 in the second compression multiplex unit 107.

The recording control unit 108 controls a drive device driving the recording medium 200 or recording protocols such as a recording address input procedure.

The input unit 109 receives a user's operation via input devices. The input unit 109 provides, as operation information, the received user operation to the control unit 110.

The control unit 110 controls the image signal processing unit 104, the first compression multiplex unit 105, the recording unit 106, the second compression multiplex unit 107, the recording control unit 108, the image generation unit 111, the image signal processing unit 113, the first de-multiplex decompression unit 114, the reproduction unit 115, and the second de-multiplex decompression unit 116, in order to perform recording processing and reproduction processing in the image recording/reproducing device 100.

The image generation unit 111 generates a menu image showing a list of contents recorded in the recording medium 200.

The reproduction unit 115 reads out from the recording medium 200 a normal content to be reproduced, and provides the normal content to the first de-multiplex decompression unit 114. The reproduction unit 115 reads out from the recording medium 200 a high-speed image sub-data associated with the normal content to be reproduced, and provides the obtained sub-data to the second de-multiplex decompression unit 116.

Using the same coding method such as MPEG-2 or H.264 as the coding method used in the first compression multiplex unit 105, the first de-multiplex decompression unit 114 de-multiplexes and decompresses the normal content provided from the reproduction unit 115. The first de-multiplex decompression unit 114 provides the resulting decompressed normal content to the image signal processing unit 113.

Using the same coding method such as MPEG-2 or H.264 as the coding method used in the second compression multiplex unit 107, the second de-multiplex decompression unit 116 de-multiplexes and decompresses the high-speed image sub-data provided from the reproduction unit 115. The second de-multiplex decompression unit 116 provides the resulting decompressed high-speed image sub-data to the image signal processing unit 113.

Figure 6:
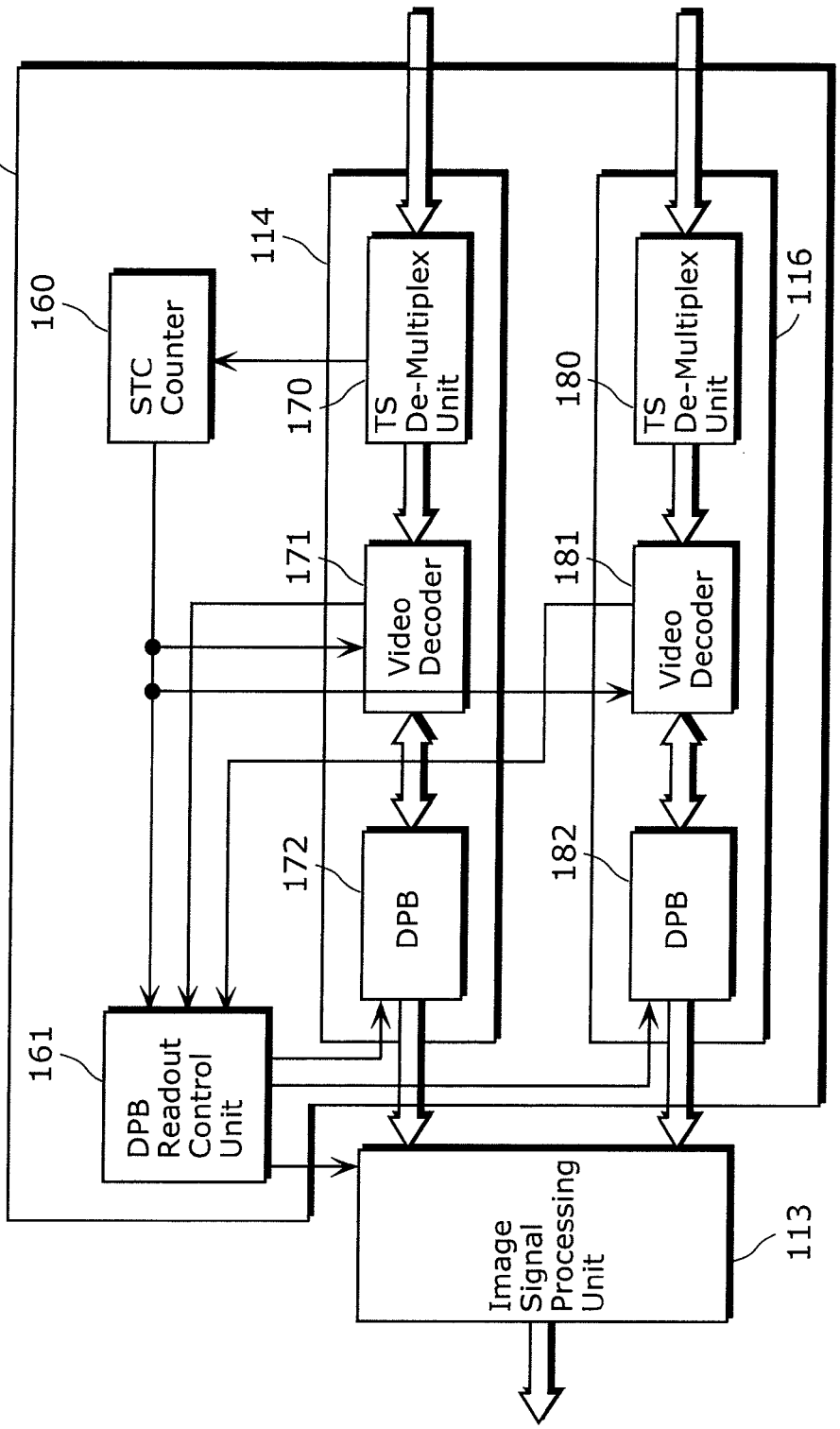
FIG. 6 is a block diagram showing a structure of a demultiplex decompression unit according to the embodiment of the present invention.

FIG. 6 is a block diagram showing a structure of the de-multiplex decompression unit 121.

As shown in FIG. 6, the de-multiplex decompression unit 121 further includes a STC counter 160 and a DPB readout control unit 161, in addition to the first de-multiplex decompression unit 114 and the second de-multiplex decompression unit 116.

The first de-multiplex decompression unit 114 includes a TS de-multiplex unit 170, a video decoder 171, and a Decoded Picture Buffer (DPB) 172. The second de-multiplex decompression unit 116 includes a TS de-multiplex unit 180, a video decoder 181, and a Decoded Picture Buffer (DPB) 182.

The TS de-multiplex unit 170 de-multiplexes the TS of the normal content read out from the recording medium 200, in order to generate a PES of video signals equivalent to image having a frame rate of 30 frs. Furthermore, from the TS of the normal content, the TS de-multiplex unit 170 de-multiplexes the PCR as the re-count reference of the STC. The TS de-multiplex unit 170 provides the generated PES to the video decoder 171, and provides the de-multiplexed PCR to the STC counter 160.

The STC counter 160 counts the STC based on the PCR provided from the TS de-multiplex unit 170. This means that the STC counter 160 re-counts the same STC as counted by the STC generation unit 146. The STC counter 160 provides the re-counted STC to the DPB readout control unit 161, the video decoder 171, and the video decoder 181.

The video decoder 171 obtains the PTSs and the DTSs from the PES provided from the TS de-multiplex unit 170, and provides the obtained PTSs to the DPB readout control unit 161. In addition, the video decoder 171 decodes (decompresses) the ES included in the PES according to the readout DTSs, thereby generating decoded image. This means that the video decoder 171 reconstructs the frames equivalent to image having a frame rate of 30 fps. The video decoder 171 provides the decoded image to the DPB 172.

The DPB 172 is a buffer in which the decoded image is stored. The decoded image is read out from the DPB 172 to the video decoder 171 to be used as reference image, if necessary. Here, as a decompressed normal content, the decoded image in the DPB 172 is read out to the image signal processing unit 113.

The TS de-multiplex unit 180 multiplexes the TS of the high-speed image sub-data read out from the recording medium 200, in order to generate a PES of video signals of the other frames except the frames equivalent to image having a frame rate of 30 fps. The TS de-multiplex unit 180 provides the generated PES to the video decoder 181.

The video decoder 181 obtains the PTSs and the DTSs from the PES provided from the TS de-multiplex unit 180, and provides the obtained PTSs to the DPB readout control unit 161. Furthermore, according to the readout DTSs, the video decoder 181 decodes the ES in the PES to generate decoded image. This means that the video decoder 181 reconstructs the other frames except the frames equivalent to image having a frame rate of 30 fps. The video decoder 181 provides the generated decoded image to the DPB 182.

The DPB 182 is a buffer in which the decoded image is stored. The decoded image is read out from the DPB 182 to the video decoder 181 to be used as reference image, if necessary. Here, as a decompressed high-speed image sub-data, the decoded image in the DPB 182 is read out to the image signal processing unit 113.

Based on the STC re-counted by the STC counter 160, the PTSs provided from the video decoder 171, and the PTSs provided from the video decoder 181, the DPB readout control unit 161 controls the DPB 172, the DPB 182, and the image signal processing unit 113.

When the normal reproduction mode is designated, the image signal processing unit 113 performs processing, such as image quality adjustment for display, on the decompressed normal content held in the DPB 172 of the first de-multiplex decompression unit 114, thereby reproducing the normal image. The image signal processing unit 113 provides the reproduced normal image to the display unit 112.

In more detail, the image signal processing unit 113 sequentially reproduces pictures included in the decompressed normal content generated by the video decoder 171, by outputting each of the pictures at a timing where a PTS of the picture corresponds to a corresponding timing of the STC re-counted by the STC counter 160.

When the high-speed reproduction mode is designated and the high-speed image sub-data is provided from the second de-multiplex decompression unit 116, the image signal processing unit 113 synthesizes the decompressed normal content with the decompressed high-speed image sub-data to smoothly reproduce the high-speed captured image, and provides the reproduced image to the display unit 112.

In more detail, the image signal processing unit 113 sequentially reproduces pictures included in the decompressed normal content and the decompressed high-speed image sub-data which are generated by the video decoder 171 and the video decoder 181, respectively, by outputting each of the pictures at a timing where a PTS of the picture corresponds to a corresponding timing of the STC re-counted by the STC counter 160. Thereby, the pictures included in the decompressed normal content and the decompressed high-speed image sub-data are sorted in an order of values of the PTSs, and reproduced sequentially in the order.

Here, there are two types of reproduction display methods for reproducing and displaying the high-speed captured image.

By the first reproduction display method, an order of the pictures in the high-speed captured image is sorted based on the PTSs, and the pictures are displayed (reproduced) using the STC re-counted based on the PCR.

In the first eproduction display method, the STC counter 160 counts a clock by a Phase Locked Loop (PLL) using the PCR de-multiplexed from the TS of the normal content. The STC counter 160 counts the STC using the clock. In this case, a frame rate for reproducing and displaying the pictures is determined depending on a speed of transmitting the content data from the reproduction unit 115 to the de-multiplex decompression unit 121.

Therefore, even if the units performing the processing of and prior to the reproduction unit 115 are implemented in a device different from the device having the units performing the processing of and after the de-multiplex decompression unit 121, the de-multiplex decompression unit 121 and the image signal processing unit 113 can reproduce the content data without any troubles, as far as the content data is transmitted from the reproduction unit 115 of the different device at a predetermined transmission speed.

If the speed of transmitting the content data from the reproduction unit 115 is the same as a speed of providing the content data to the recording unit 106 at the time of recording the content data, the high-speed captured image is reproduced at the original frame rate (namely, the frame rate of capturing the data), for example, at a frame rate of 300 fields per second. When slow playback of the high-speed captured image is performed at a frame rate of 30 fps, for example, a speed of transmitting the content data from the reproduction unit 115 to the de-multiplex decompression unit 121 is lowered. Here, the clock re-count of the STC counter 160 needs a PLL that allows a frequency of the clock to be switched to a lower frequency for the slow playback.

On the other hand, by the second reproduction display method, the image signal processing unit 113 sorts an order of the pictures in the high-speed captured image based on the PTSs of the pictures, and decides a frame rate for displaying (reproducing) the pictures.

In this method, the STC counter 160 perform the STC re-count using a crystal oscillator or the like. In this case, depending on a frequency of the clock provided to the STC counter 160, a frame rate for reproducing and displaying the pictures is determined. Here, a PLL circuit is not necessary to re-count the clock in the STC counter 160, which simplifies the hardware structure of the image recording/reproducing device.

However, since the de-multiplex decompression unit 121 determines a processing rate (namely, a data rate or a frame rate) of the content data, it is necessary to control a readout speed at which the reproduction unit 115 reads out the content data from the recording medium 200 depending on how the de-multiplex decompression unit 121 processes data. Therefore, if the units performing the processing of and prior to the reproduction unit 115 are implemented in a device different from this device having the units performing the processing of and after the de-multiplex decompression unit 121, it is difficult to achieve the image recording/reproducing device.

When slow playback of the high-speed captured image is performed, a frequency of the clock provided to the STC counter 160 is lowered. More specifically, when slow playback of the high-speed captured image is performed, a divider is used for counting the clock of the STC counter 160, or the clock is switched to a clock counted by a different oscillator. In this case, since a processing speed of processing the content data by the de-multiplex decompression unit 121 is lowered, the reproduction unit 115 needs to lower the readout speed of reading the content data and the transmission speed of transmitting the content data depending on how much the processing speed is lowered.

It should be noted that in the second reproduction display method, instead of re-counting the STC by the STC counter 160, it is possible that frame pulses are generated by a counter corresponding to a frame rate for reproducing and displaying the pictures, and then provided to the DPB readout control unit 161. In this case, after sorting an order of the pictures according to the PTSs, the pictures can be reproduced according to cycles of the frame pulses, without detecting a timing where each PTS corresponds to a corresponding timing of the re-counted STC. As a result, the hardware structure of the image recording/reproducing device can be further simplified.

As explained above, the image signal processing unit 113 provides, as image signals, the menu image and the like generated by the image generation unit 111 to the display unit 112, without performing any processing on the menu image and the like, or by multiplexing the menu image and the like by the decompressed normal reproduction image provided from the first de-multiplex decompression unit 114.

The display unit 112 reproduces the normal reproduction image, the slow playback image, the menu image, or image signals including the menu image, and displays the reproduced image on a monitor or the like.

In more detail, at the high-speed reproduction mode, the display unit 112 sequentially reproduces the pictures provided from the video decoders 171 and 181, by outputting each of the pictures at a timing where a PTS of the picture corresponds to a corresponding timing of the STC re-counted by the STC counter 160. In other words, the display unit 112 reproduces the pictures in an order of values of the PTSs sorted by the image signal processing unit 113.

Next, the processing performed by the image recording/reproducing device 100 is described.

Firstly, the recording processing performed by the image recording/reproducing device 100 is described.

Figure 7:
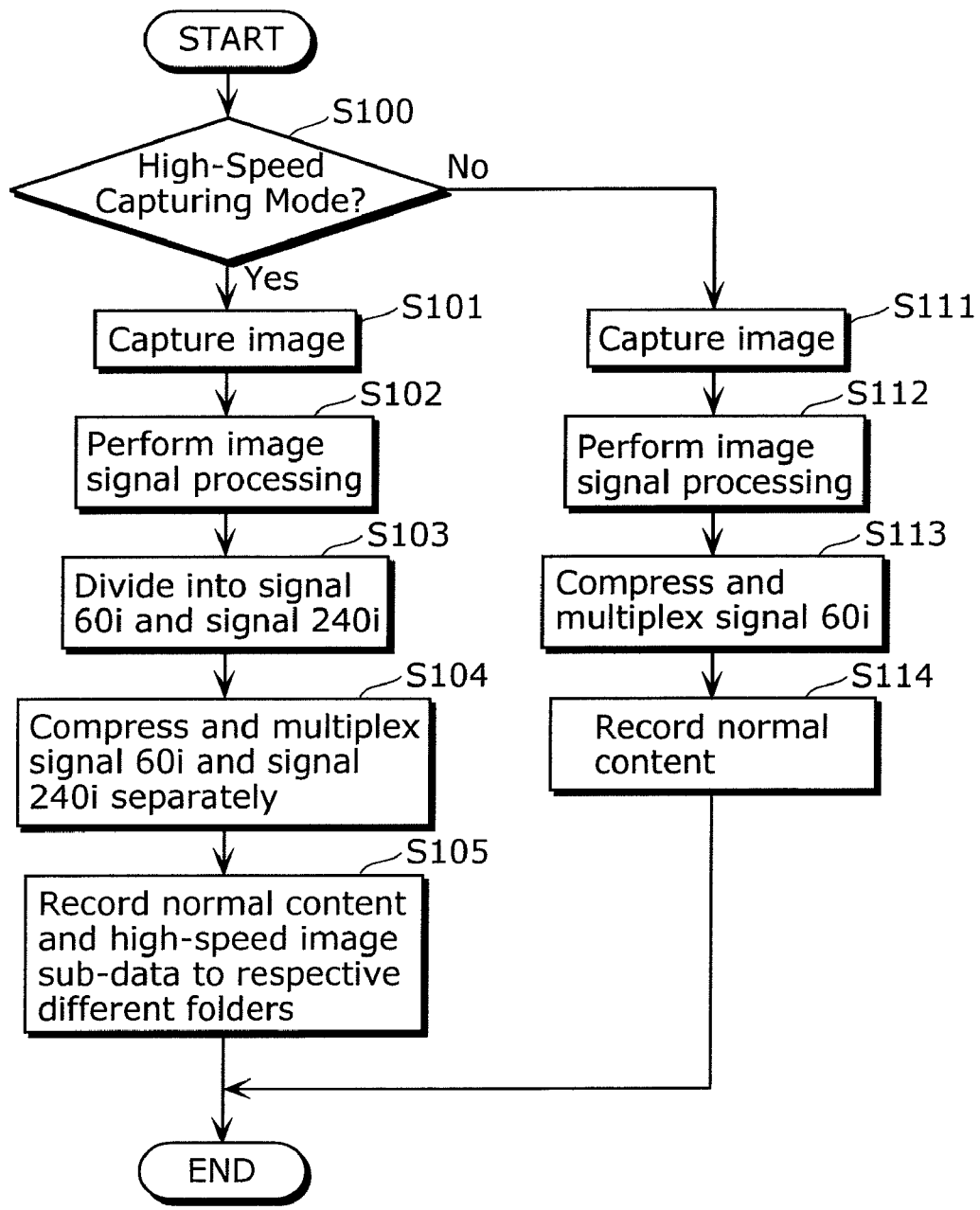
FIG. 7 is a flowchart of recording processing performed by the image recording/reproducing device according to the embodiment of the present invention.

FIG. 7 is a flowchart of the reproduction processing performed by the image recording/reproducing device 100.

Firstly, the control unit 110 checks a capturing mode set by a user using the input unit 109 (S100).

If the capturing mode is the high-speed capturing mode (Yes at S100), then the imaging unit 102 images light received via the lens group 101 (S101). The imaging unit 102 converts signals of the received light to analog signals. The A/D conversion unit 103 converts the analog signals to digital signals.

Next, the image signal processing unit 104 performs image signal processing, such as noise cancellation and image quality adjustment, on the digital signals provided from the A/D conversion unit 103 in order to generate image signals (S102).

The image signal processing unit 104 divides the generated image signals into (i) frames equivalent to image having a frame rate of 30 fps and (ii) the other frames (S103).

Figure 8:
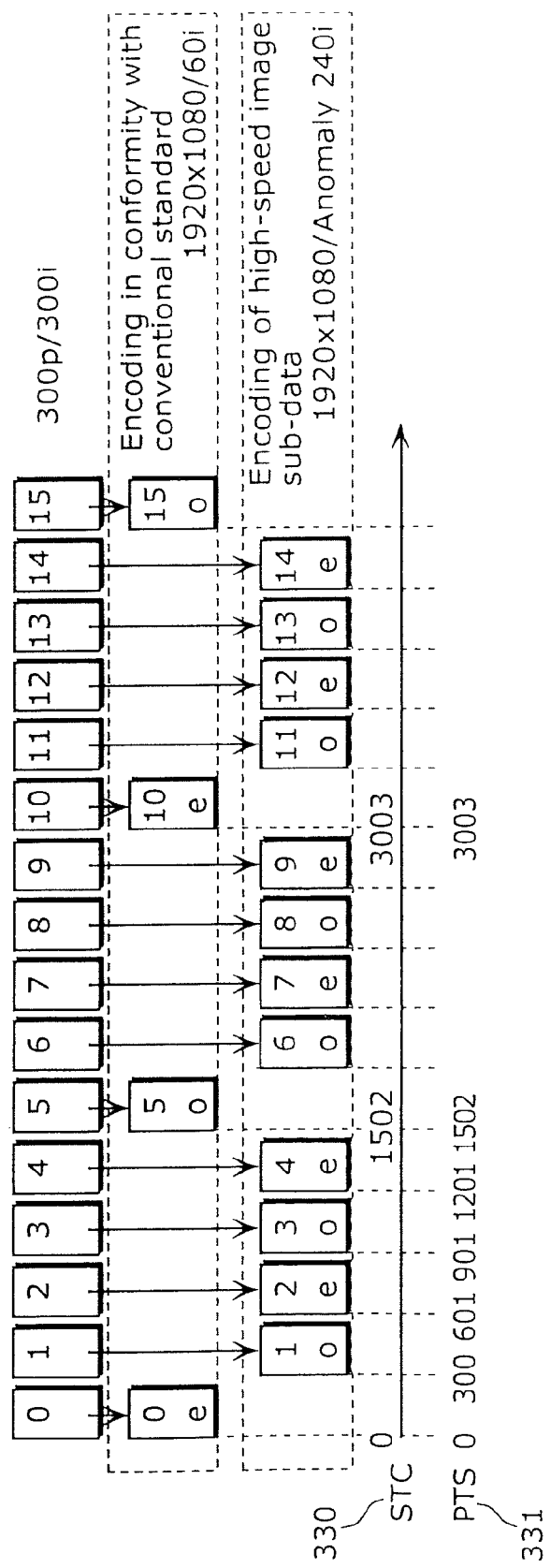
FIG. 8 is a schematic diagram of processing performed by an image signal processing unit, a first compression multiplex unit, and a second compression multiplex unit according to the embodiment of the present invention.

FIG. 8 is a schematic diagram of the processing performed by the signal processing unit 104, the first compression multiplex unit 105, and the second compression multiplex unit 107 according to the embodiment of the present invention.

FIG. 8 shows an example where the image signal processing unit 104 generates image having a frame rate of 300 fps using progressive scanning (hereinafter, the images is referred to as "image 300 $p$") or image having a frame rate of 300 fields per second using interlace scanning (hereinafter, the images is referred to as "image 300*i*") from the signals provided via the lens group 101, the imaging unit 102, and the A/D conversion unit 103. Here, the image is assumed to be well-known high-resolution image having an image size of 1920×1080 pixels.

The image signal processing unit 104 retrieves one frame every five frames from the image 300*p*. The image signal processing unit 104 scans only even lines and then only odd lines alternately in each of the retrieved frame, so as to generate signals of interlaced image having a frame rate of 60 fields per second (30 frames per second) (hereinafter, referred to as "signal 60*i*").

It is also possible that the image signal processing unit 104 generates the signal 60*i* by retrieving one filed every five fields from the image 300*i*.

The signal 60*i* is video signal in conformity to a conventional standard, such as Blu-ray Disc (BD) or Advanced Video Codec High Definition (AVCHD). Therefore, the first compression multiplex unit 105 can perform compression coding using the conventional standard and record the result as a normal content to the recording medium 200 in a recording format in conformity to the conventional standard.

On the other hand, the image signal processing unit 104 scans only even lines and then only odd lines alternately in each of remaining frames except the retrieved frames in the high-speed captured image 300*p* (in other words, each of four frames every five frames in the image 300*p*), so as to generate signals of interlaced image having a frame rate of 240 fields per second (hereinafter, referred to as "signal 240*i*"). Here, as shown in FIG. 8, in image having a frame rate of 240 fields per second, the fields are not at regular intervals, so that the signal is called anomaly signal 240*i*. It is also possible that the image signal processing unit 104 generates the anomaly signal 240i by retrieving remains after retrieving the signal 60i from the high-speed captured image 300i (in other words, four fields every five fields in the image 300i).

The anomaly signal 240i is not conformity to the conventional standard. However, since correlation between pictures remains, it is possible that the second compression multiplex unit 107 performs compression coding using a well-known hybrid coding such as MPEG-2 or H.264 and records the results as high-speed image sub-data to the recording medium 200 in a non-conventional unique format.

The first compression multiplex unit 105 and the second compression multiplex unit 107 compress and multiplex the signal 60i and the signal 240i, respectively, which are divided by the image signal processing unit 104 (S104).

More specifically, the frame buffer 140 holds the signal 60i provided from the image signal processing unit 104. The video encoder 141 compresses the signal 60i held in the frame buffer 140 to generate an ES.

The STC generation unit 146 counts the STC 330.

FIG. 9 is a table showing relationships of a field (or frame) time, a STC, and a PTS between the signal 60i and the signal 300p.

As shown in FIG. 9, regarding the signal 60i, a time period of each field is 16.68 milliseconds (msec). Here, the STC 330 is counted with a frequency of 27 MHz and expressed by a value of 33 bits. Therefore, each field of the signal 60i has 450450 counts of the STC 330.

On the other hand, regarding the signal 300p, a time period of each frame is 3.34 msec. Therefore, each field of the signal 300p has 90090 counts of the STC 330.

Based on the STC 330, the PTS/DTS generation unit 144 generates a PTS 331 and a DTS to correspond to respective corresponding timings of the STC 330, for each of the pictures in the ES generated by the video encoder 141. Each of the PTS 331 and the DTS is counted with a frequency of 90 kHz. Therefore, each field of the signal 60i has 1501.5 counts for a PTS 331. As a result, as shown in FIG. 8, a PTS 331 of a frame 0 has a value of "0", and a PTS 331 of a frame 5 has a value of "1502".

The PES multiplex unit 142 multiplexes the PTSs 331 and the DTSs to the ES generated by the video encoder 141 to generate a PES.

The PCR generation unit 145 generates a PCR. The TS multiplex unit 143 packetizes the PES generated by the PES multiplex unit 142 into TS packets. When generating the TS packets, the TS multiplex unit 143 multiplexes the PES with the PCR and the like.

The TSs generated by the TS multiplex unit 143 are provided as a normal content to the recording unit 106.

On the other hand, the frame buffer 150 holds the anomaly signal 240i provided from the image signal processing unit 104. The video encoder 151 compresses the anomaly signal 240i held in the frame buffer 150 to generate an ES.

Based on the STC 330, the PTS/DTS generation unit 154 generates a PTS 331 and a DTS to be correspond to respective corresponding timings of the STC 330, for each of the pictures included in the ES generated by the video encoder 151. Regarding the signal 300p, each frame has 300.3 counts for the PTS 331. Therefore, as shown in FIG. 8, a PTS 331 of a frame 1 has a value of "300", a PTS 331 of a frame 2 has a value of "601", and a PTS 331 of a frame 3 has a value of "901".

The PES multiplex unit 152 multiplexes the PTSs 331 and the DTSs of the pictures (namely, the frames) to the ES generated by the video encoder 151 to generate a PES.

The PCR generation unit 155 generates a PCR. The TS multiplex unit 153 packetizes the PES generated by the PES multiplex unit 152 into TS packets. When generating the TS packets, the TS multiplex unit 153 multiplexes the PES with the PCR and the like.

The TSs generated by the TS multiplex unit 153 are provided as high-speed image sub-data to the recording unit 106.

Next, the recording unit 106 records (i) the normal content generated by the first compression multiplex unit 105 and (ii) the high-speed image sub-data generated by the second compression multiplex unit 107, to respective different folders in the recording medium 200 (S105).

Here, when recording the normal content and the high-speed image sub-data to the recording medium 200, the recording unit 106 assigns an Arrival TimeStamp (ATS) indicating a reproduction reference to each of the TS packets 321 included in the normal content and the high-speed image sub-data. The ATSs assigned to the TSs of the normal contents and the ATSs assigned to the TSs of the high-speed image sub-data are not in association with each other.

Figure 10:
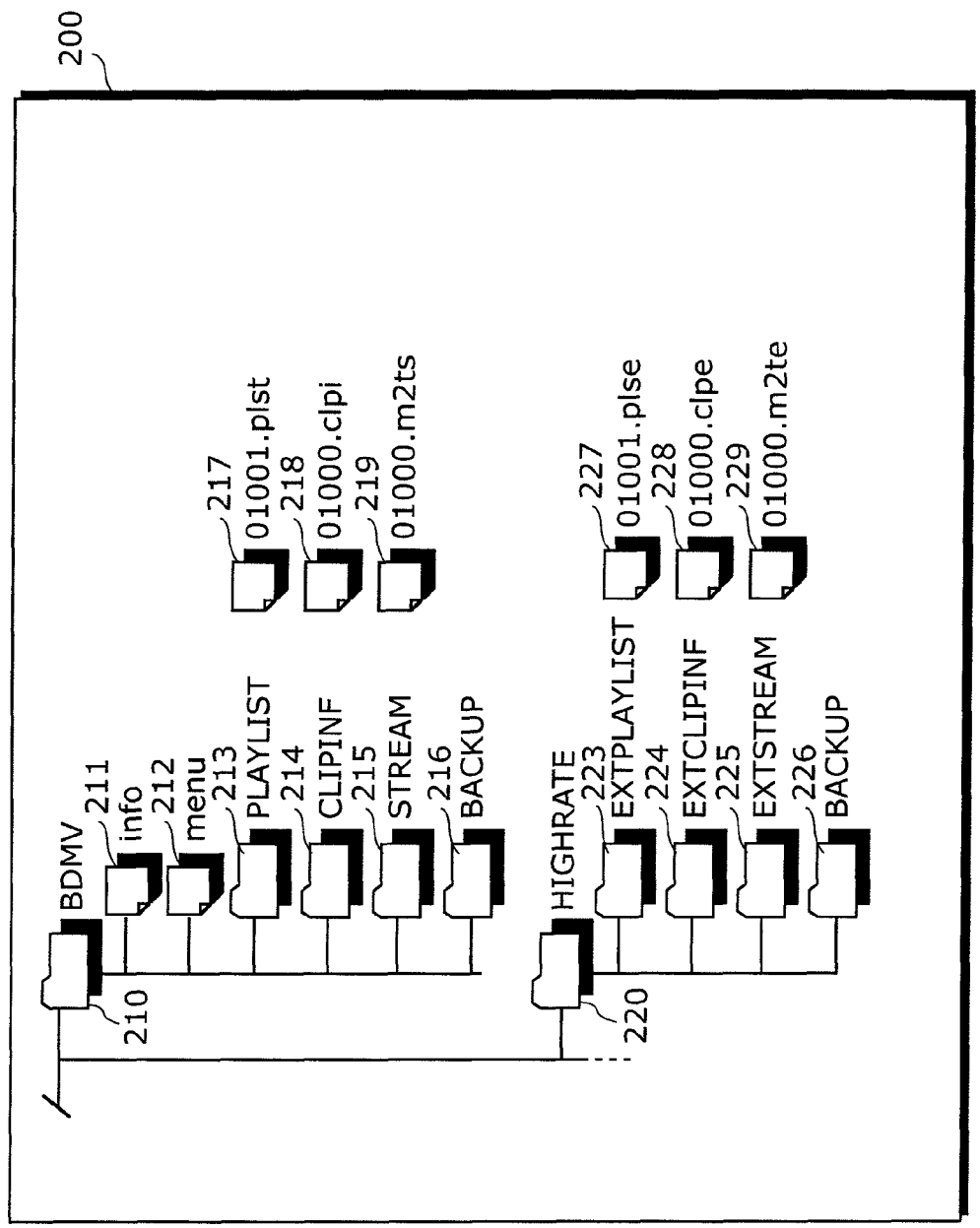
FIG. 10 is a diagram showing an example of a file structure of files recorded in a recording medium according to the embodiment of the present invention.

FIG. 10 is a diagram showing an example of a file structure of files recorded in the recording medium 200 according to the embodiment of the present invention.

As shown in FIG. 10, in a file system for files recorded in the recording medium 200 there are a BDMV main folder 210 and a HIGHRATE main folder 220 at a highest hierarchy layer of a directory structure.

The BDMV main folder 210 is a folder for compatibility with a conventional standard. In the BDMV main folder 210, normal contents are recorded in a recording format in conformity to the conventional standard. On the other hand, the HIGHRATE main folder 220 is a folder for high-speed captured image. In the HIGHRATE main folder 220, the high-speed image sub-data is recorded in a non-conventional unique recording format.

Below the BDMV main folder 210, there are an information file 211 (info), a menu file 212 (menu), a playlist folder 213 (PLAYLIST), clipinfo folder 214 (CLIPINF), a stream folder 215 (STREAM), and a backup folder 216 (BACKUP).

The information file 211 (info) includes management information for managing the entire directory. The menu file 212 (menu) includes information for structuring a menu.

Below the playlist folder 212 (PLAYLIST), a playlist file 217 (01001.plst) is stored. The playlist file 217 (01001.plst) includes information for reproducing normal contents. In more detail, the playlist file 217 has information regarding an order of reproducing normal contents. In addition, the playlist file 217 includes (i) information for designating clipinfo files 218 and (ii) reproduction time information.

Below the clipinfo folder 214 (CLIPINF), a clipinfo file 218 (01000.clpi) is stored. The clipinfo file 218 (01000.clpi) includes information for reproducing a normal content. In more detail, the clipinfo file 218 indicates a relationship between time information and a position of image data (a stream file 219). Further, the clipinfo file 218 includes a time table for achieving partial playback and special playback of the corresponding image data. Furthermore, the clipinfo file 218 includes information regarding the corresponding image data, such as an image size and a compression method.

Below the stream folder 215 (STREAM), a stream file 219 (01000.m2ts) is stored. The stream file 219 (01000.m2ts) is an audio-visual (AV) data file.

The backup folder 216 (BACKUP) holds copies of the information file 211 (info), the menu file 212 (menu), the playlist folder 213 (PLAYLIST), and the clipinfo folder 214 (CLIPINF), which are currently being edited. Thereby, it is possible to prevent that normal contents cannot be reproduced due to power discontinuity or the like in the middle of the editing.

Below the HIGHRATE main folder 220, there are a playlist folder 223 (EXTPLAYLIST), a clipinfo folder 224 (EXT-CLIPINF), a stream folder 225 (EXTSTREAM), and a backup folder 226 (BACKUP).

Below the playlist folder 223 (EXTPLAYLIST), a playlist file 227 (01001.plse) is stored. The playlist file 227 (01001.plse) includes information for reproducing high-speed image sub-data. In more detail, the playlist file 227 includes information regarding an order of reproducing pictures of the high-speed image sub-data. In addition, the playlist file 227 includes (i) information for designating clipinfo files 228 and (ii) reproduction time information.

Below the clipinfo folder 224 (EXTCLIPINF), a clipinfo file 228 (01000.clpe) is stored. The clipinfo file 228 (01000.clpe) includes information for reproducing high-speed image sub-data. In more detail, the clipinfo file 228 indicates a relationship between time information and a position of image data (a stream file 229). In addition, the clipinfo file 228 includes a time table for achieving partial playback and special playback of the corresponding image data. Furthermore, the clipinfo file 228 includes information regarding the corresponding image data, such as an image size and a compression method.

Below the stream folder 225 (EXTSTREAM), a stream file 229 (01000.m2te) is stored. The stream file 229 (01000.m2te) is a file of high-speed image sub-data.

The backup folder 226 (BACKUP) holds copies of the playlist folder 223 (EXTPLAYLIST), and clipinfo folder 224 (EXTCLIPINF), which are, for example, currently being edited.

Here, the BDMV main folder 210 and the HIGHRATE main folder 220 have the same hierarchical structure of the below-folders.

As described above, at the high-speed capturing mode, the image recording/reproducing device 100 records (i) image data equivalent to image having a frame rate of 30 fps in conformity to the conventional standard from among image data having a frame rate of 300 fields per second, in or below the BDMV main folder 210, and (ii) other image data except the image data equivalent to image having the frame rate of 30 fps, in or below the HIGHRATE main folder 220.

On the other hand, when the capturing mode is the normal capturing mode (No at S100), then the imaging unit 102 images light received via the lens group 101 (S111). The imaging unit 102 converts signals of the received light to analog signals. The A/D conversion unit 103 converts the analog signals to digital signals.

Next, the image signal processing unit 104 performs image signal processing, such as noise cancellation and image quality adjustment, on the digital signals provided from the A/D conversion unit 103 in order to generate image signals (signal 60i) (S112).

Next, the first compression multiplex unit 105 compresses and multiplexes the signal 60i generated by the image signal processing unit 104 to generate data of a normal content in conformity to the conventional standard (S113). Here, the processing performed by the first compression multiplex unit 105 at the normal capturing mode is the same as the processing performed at the high-speed capturing mode, so that description of the processing is not repeated.

Next, the recording unit 106 records the normal content generated by the first compression multiplex unit 105 to the BDMV main folder 210 in the recording medium 200 (S114).

As described above, at the normal capturing mode, the image recording/reproducing device 100 records image data equivalent to image having a frame rate of 30 fps in conformity to the conventional standard, in or below the BDMV main folder 210.

Here, the above-described processing performed by the image signal processing unit 104, the compression multiplex unit 120, and the recording unit 106 are controlled by the control unit 110. On the other hand, the above-described processing performed by the frame buffers 140 and 150, the video encoders 141 and 152, the PES multiplex units 142 and 152, the TS multiplex units 143 and 153, the PTS/DTS generation units 144 and 154, the PCR generation units 145 and 155, and the STC generation units 146 are controlled by the compression multiplex control unit 130. Moreover, a disk position and the like in recording data from the recording unit 106 to the recording medium 200 is controlled by the recording control unit 108.

Next, the reproduction processing performed by the image recording/reproducing device 100 is described.

Figure 11:
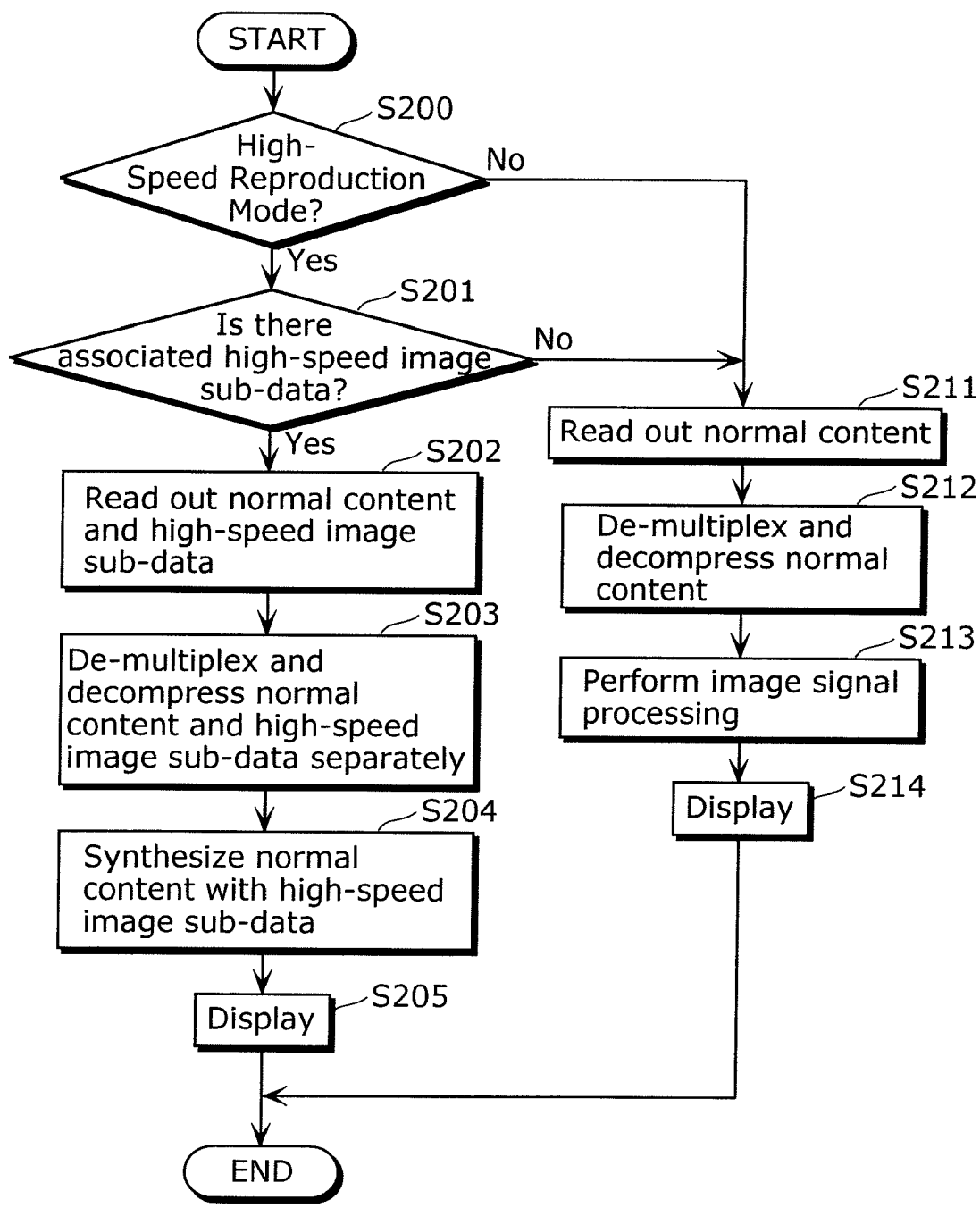
FIG. 11 is a flowchart of reproduction processing performed by the image recording/reproducing device according to the embodiment of the present invention.

FIG. 11 is a flowchart of the reproduction processing performed by the image recording/reproducing device 100.

Firstly, the control unit 110 checks a reproduction mode set by the user via the input unit 109 (S200).

When the reproduction mode is the normal reproduction mode (No at S200), then the reproduction unit 115 reads out the normal content to be reproduced from the recording medium 200 (S211).

Figure 12:
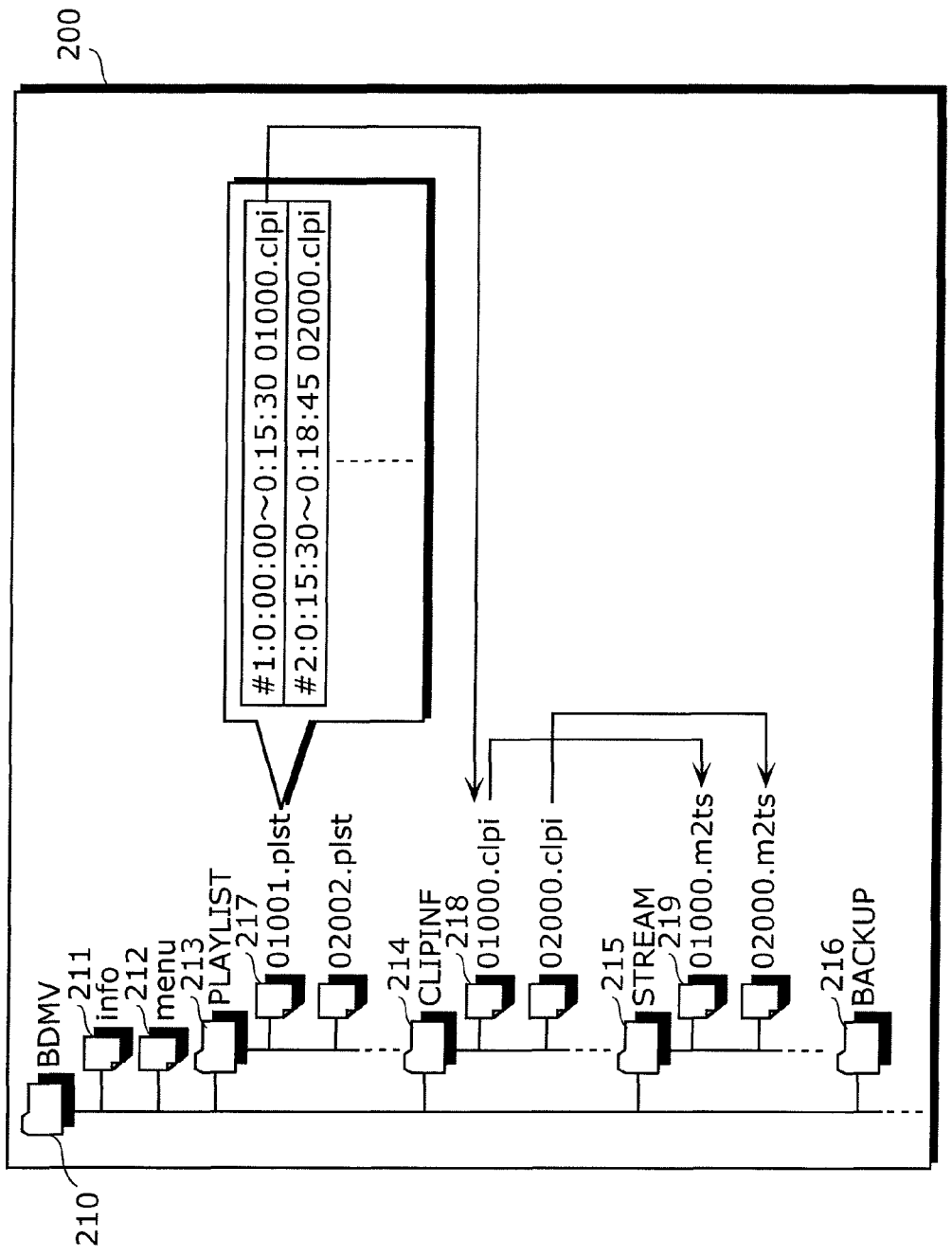
FIG. 12 is a diagram for explaining relationships among files in and below a BDMV main folder in the file structure of FIG. 10.

FIG. 12 is a diagram for explaining relationships among files in and below a BDMV main folder 210 in the file structure of FIG. 10.

At the normal reproduction mode, the control unit 110 uses three kinds of files, which are the playlist file 217, the clipinfo file 218, and the stream file 219, in order to control reproduction.

The playlist file 217 includes (i) information for designating clipinfo files 218 and (ii) reproduction time information. The reproduction unit 115 sequentially refers to the clipinfo files 218 indicated in the playlist file 217 to be reproduced. The reproduction unit 115 reads out a corresponding stream file 219 designated in the time table in each of the clipinfo files 218.

For example, the playlist file 217 (01001.plst) includes a clip (#1) and a clip (#2), and indicates that reproduction is performed in an order of the clip (#1) and then the clip (#2). For the clip (#1), the reproduction unit 115 reads out a stream file 219 (01000.m2ts) in association with a clipinfo file 218 (01000.clpi). For the clip (#2), the reproduction unit 115 reads out a stream file 219 (02000.m2ts) in association with a clipinfo file 218 (02000.clpi).

The first de-multiplex decompression unit 114 de-multiplexes and decompresses the normal content read out by the reproduction unit 115 (S212).

In more detail, the TS de-multiplex unit 170 de-multiplexes the TS of the normal content read out from the recording medium, in order to generate a PES of video signals equivalent to image having a frame rate of 30 frs. Furthermore, from the TS of the normal content, the TS de-multiplex unit 170 de-multiplexes the PCR as a re-count reference of the STC.

The STC counter 160 re-counts the STC based on the PCR de-multiplexed by the TS de-multiplex unit 170.

The video decoder 171 reads out the PTSs and the DTSs from the PES generated by the TS de-multiplex unit 170. Furthermore, according to the readout DTSs, the video decoder 171 decodes the ES in the PES to generate decoded image.

The DPB 172 holds the decoded image (decompressed normal content) generated by the video decoder 171.

The image signal processing unit 113 performs processing, such as image quality adjustment for display, on the decompressed normal content held in the DPB 172, thereby generating normal reproduction image (S213).

The display unit 112 reproduces the normal reproduction image generated by the image signal processing unit 113 to display the reproduced image on a monitor or the like (S214).

As described above, at the normal capturing mode, the image recording/reproducing device 100 reads out image data equivalent to image having a frame rate of 30 fps in conformity to the conventional standard from the BDMV main folder 210 and reproduces the read-out image data.

Here, the file structure in the BDMV main folder 210 is the same as folder structures of the conventional standard. Thereby, even if the image reproducing devices in conformity to the conventional standard which does not support reproduction of high-speed captured image reproduce the recording medium 200, the image reproducing devices can reproduce image equivalent to image having a frame rate of 30 fps. In addition, the image reproducing devices in conformity to the conventional standard can also use other conventional functions such as playlist editing.

On the other hand, when the reproduction mode is the high-speed reproduction mode (Yes at S200), the control unit 110 determines whether or not high-speed image sub-data in association with the normal content to be reproduced is recorded in the recording medium 200 (S201).

Figure 13:
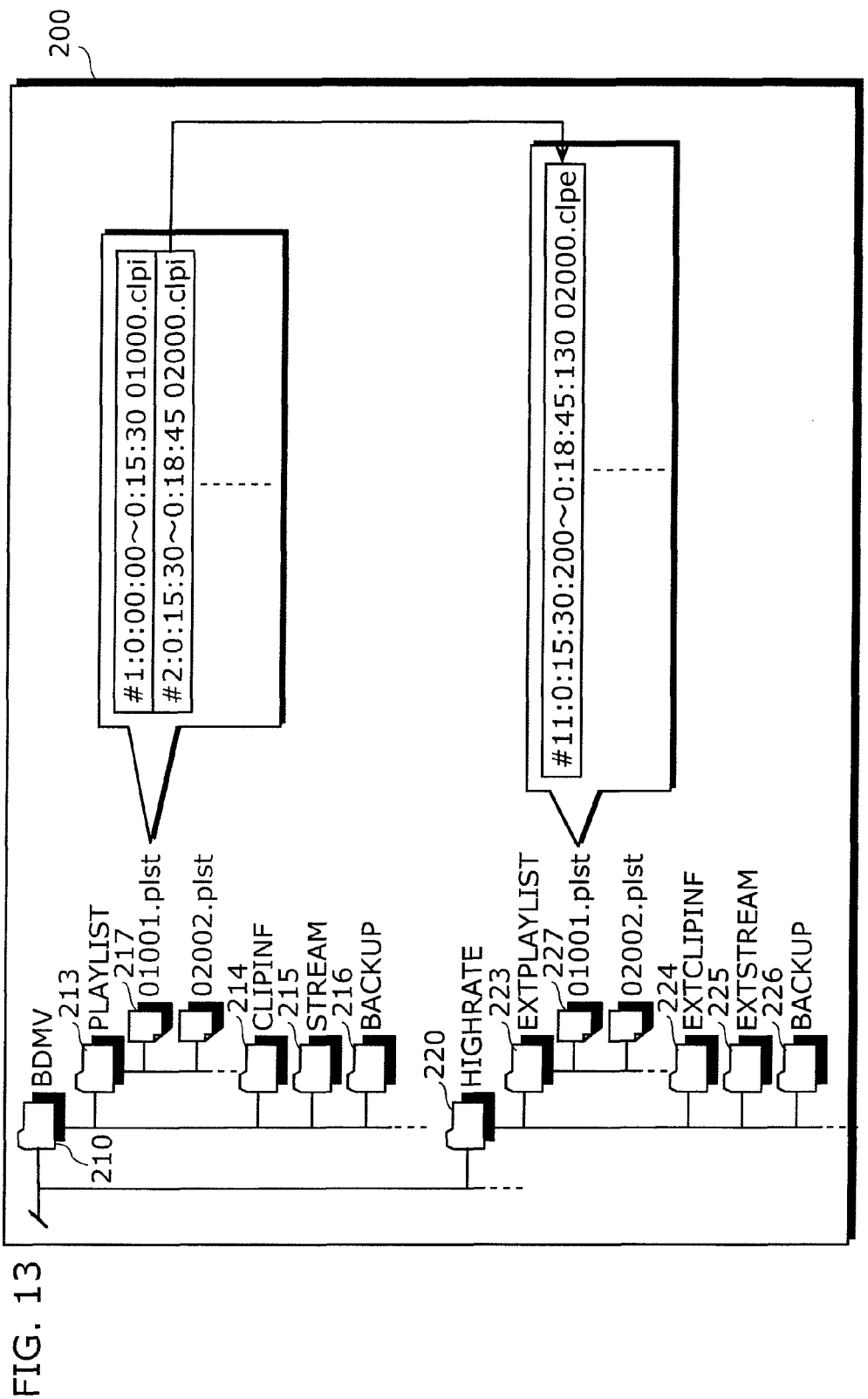
FIG. 13 is a diagram for explaining relationships among files in and below the BDMV main folder and files in and below a HIGHRATE main folder in the file structure of FIG. 10.

FIG. 13 is an example for explaining relationships among files in and below the BDMV main folder 210 and files in and below the HIGHRATE main folder 220 in the file structure of FIG. 10.

At the high-speed reproduction mode, the control unit 110 refers to the playlist file 227 in the HIGHRATE main folder 220, in addition to the playlist file 217 in the BDMV main folder 210.

At the high-speed capturing mode, to the HIGHRATE main folder 220 the recording unit 106 records high-speed image sub-data in association with a clip of a normal content. The playlist file 227 regarding the high-speed image sub-data indicates (i) a clipinfo file 218 regarding high-speed image sub-data available for reproducing the normal content and (ii) reproduction time information. Here, the reproduction time information indicated in the playlist file 227 is indicated for each frame of high-speed captured image.

The reproduction unit 115 firstly refers to the playlist file 217 regarding the normal content and then the playlist file 227 regarding the high-speed image sub-data.

The following describes the situation where the first clip (#1) included in the playlist file 217 is reproduced. Here, the playlist file 227 regarding high-speed image sub-data does not have any clip in association with the clip (#1). In other words, the clip (#1) is image data recorded at the normal capturing mode, or image data recorded by an image recording device in conformity to the conventional standard which does not support recording of high-speed captured image.

Since the high-speed image sub-data is not recorded (No at S210), the image recording/reproducing device 100 performs the same processing as the processing for the normal reproduction mode (S211 to S214). It should be noted that, when the recording medium 200 does not have such associated high-speed image sub-data (No at S201), then the control unit 110 may display detail of the error or the like to the user and complete the reproduction processing. Or, the image recording/reproducing device 100 may perform slow playback for the normal content at normal frame intervals.

Next, processing for reproducing the clip (#2) is described. Here, the playlist file 227 regarding high-speed image sub-data has a clip (#11) in association with the clip (#2). In other words, the clip (#2) is image data recorded at the high-capturing mode.

Since the high-speed image sub-data is recorded (Yes at S201), the reproduction unit 115 reads out from the recording medium 200 the normal content to be reproduced and the high-speed image sub-data in association with the normal content (S202). In more detail, the reproduction unit 115 reads out a stream file 229 (02000.m2te) regarding the high-speed image sub-data in association with a clipinfo file 228 (02000.clpe). The reproduction unit 115 also reads out a stream file 219 (02000.m2ts) regarding the normal content in association with a clipinfo file 218 (02000.clpi).

Next, the first de-multiplex decompression unit 114 de-multiplexes and decompresses the normal content read out by the reproduction unit 115, and the second de-multiplex decompression unit 116 de-multiplexes and decompresses the high-speed image sub-data read out by the reproduction unit 115 (S203).

In more detail, the TS de-multiplex unit 170 de-multiplexes the TS of the normal content read out from the recording medium 200, in order to generate a PES of video signals of the signal 60i. Furthermore, from the TS of the normal content, the TS de-multiplex unit 170 de-multiplexes the PCR as a re-count reference of the STC.

The STC counter 160 re-counts the STC based on the PCR de-multiplexed by the TS de-multiplex unit 170.

The video decoder 171 reads out the PTSs and the DTSs from the PES generated by the TS de-multiplex unit 170. Furthermore, according to the readout DTSs, the video decoder 171 decodes the ES in the PES to generate decoded image.

The DPB 172 holds the decoded image (decompressed normal content) generated by the video decoder 171.

On the other hand, the TS de-multiplex unit 180 de-multiplexes the TSs of the high-speed image sub-data read out from the recording medium 200, to generate a PES of video signals of the anomaly signal 240i. Here, the TSs of the high-speed image sub-data are also multiplexed with the PCR, but this PCR is not used to re-count the STC of the STC counter 160.

The video decoder 181 reads out the PTSs and the DTSs from the PES provided from the TS de-multiplex unit 180. Furthermore, according to the readout DTSs, the video decoder 181 decodes the ES in the PES to generate decoded image.

The DPB 182 holds the decoded image (decompressed high-speed image sub-data) generated by the video decoder 181.

The image signal processing unit 113 synthesizes the decompressed normal content with the decompressed high-speed image sub-data to reconstruct image signals having a frame rate of 300 fields per second. The image signal processing unit 113 generates smooth slow playback image from the reconstructed image signals having the frame rate of 300 fields per second (S204).

The processing performed by the image signal processing unit 113 for decoding the image signals having a frame rate of 300 fields per second is controlled by the DPB readout control unit 161. More specifically, in order to decode the image signals of the signal 300i, the DPB readout control unit 161 controls the image signal processing unit 113 to sequentially reproduce the pictures (or, fields or frames) provided from the video decoders 171 and 181 by outputting each of the pictures at a timing where a PTS of the picture corresponds to a corresponding timing of the STC provided from the STC counter 160. Moreover, the image signal processing unit 113 generates slow playback image of the pictures by sequentially outputting the pictures at a frame rate according to a speed of slow playback.

The display unit 112 reproduces the slow playback image generated by the image signal processing unit 113 and displays the reproduced image on a monitor or the like (S205).

As described above, at the high-speed reproduction mode, the image recording/reproducing device 100 reads out (i) image data equivalent to image having a frame rate of 30 fps in conformity to the conventional standard from the BDMV main folder 210 and (ii) high-speed image sub-data from the HIGHRATE main folder 220. The image recording/reproducing device 100 reconstructs and reproduces high-speed image using (i) the readout image data equivalent to image having a frame rate of 30 fps and (ii) the readout high-speed image sub-data.

Here, the above-described processing performed by the reproduction unit 115, the de-multiplex decompression unit 121, and the image signal processing unit 113 are controlled by the control unit 110.

When the image data recorded by the image recording/reproducing device 100 to the recording medium 200 is reproduced directly by the image recording/reproducing device 100, the STC counter 160 is not always necessary. In this case, since the image recording/reproducing device 100 obtains information of the frame rate (300*i*) of the high-speed captured image recorded on the recording medium 200, the image recording/reproducing device 100 can control a speed of reading out the data from the recording medium 200 according to the frame rate of the high-speed captured image. Thereby, the image signal processing unit 113 adjusts only an order of outputting (reproducing) the pictures in the normal content and the pictures in the high-speed image sub-data according to the values of the PTSs of the pictures, and then sequentially reproduces the pictures at the original frame (300*i*). In other words, the image signal processing unit 113 outputs (reproduces) the pictures at a frame rate of 300 fields per second in an order of the pictures having the PTSs having smaller values in the normal content and the high-speed captured image.

Furthermore, when smooth slow playback image is outputted, the image signal processing unit 113 outputs (reproduces) the pictures at timings having a frame rate slower than the original frame rate (300*i*). In other words, the image signal processing unit 113 outputs (reproduces) the pictures at a frame rate (for example, 60 fields per second) slower than the frame rate of 300 fields per second, in an order of the pictures having the PTSs having smaller values in the normal content and the high-speed captured image.

As explained above, it is also possible that the image recording/reproducing device 100 does not have the STC counter 160, but decides a timing of reading out pictures from the DPBs 172 and 182 according to a timing of reproducing/displaying the pictures, and therefore manages only an order of reading out the pictures using values of PTSs of the pictures.

In other words, the STC counter 160 is necessary only when the data read out from the recording medium 200 is transmitted between devices before the readout data is provided to the first de-multiplex decompression unit 114 and the second de-multiplex decompression unit 116. In this case, it is impossible to control a speed of reading out the data from the recording medium 200 to be cooperated with the processing of a circuit in which units performing processing of and after the first de-multiplex decompression unit 114 and the second de-multiplex decompression unit 116 are implemented.

Therefore, as described above, it is necessary to re-count the STC based on the PCR multiplexed in TSs of a normal content, and then control a timing of outputting (reproducing) pictures in the normal content and high-speed image sub-data with reference to the STC.

As described above, the image recording/reproducing device 100 according to the embodiment of the present invention can record high-speed captured image to the recording medium 200 and reproduce smooth slow playback image.

In addition, when the recording medium recorded by the image recording/reproducing device 100 is inserted to image reproducing devices in conformity to conventional standards which do not support reproduction of high-speed captured image, the image reproducing devices can reproduce image equivalent to image having a frame rate of 30 fps. Moreover, the image reproducing devices can reproduce image for which screen reduction and screen division multiplexing are not performed. That is, the image recording/reproducing device 100 can ensure compatibility with image reproducing devices having conventional standards.

Furthermore, image recording/reproducing device 100 assigns PTSs generated using the same STC to normal content and high-speed image sub-data which are generated by dividing the same high-speed captured image. Thereby, when the high-speed captured image recorded by the image recording/reproducing device 100 to the recording medium 200 is reproduced by an image reproducing device supporting reproduction of high-speed captured image, the supporting image reproducing device can easily detect relationships of reproduction timings among the pictures in the normal content and the pictures in the high-speed image sub-data. More specifically, the supporting image reproducing device can reproduce the high-speed captured image by outputting pictures in the normal content and pictures in the high-speed image sub-data in an order of values of PTSs of the pictures and at timings according to a frame rate, with reference to only the PTSs.

Furthermore, the image recording/reproducing device 100 records both of image data in conformity to a conventional standard and high-speed image sub-data to a single file system in the recording medium 200. Therefore, the high-speed captured image recorded by the image recording/reproducing device 100 can be managed more easily than high-speed captured image which is divided into (i) image data in conformity to a conventional standard and (ii) high-speed image sub-data to be recorded in respective different recording mediums. That is, the image recording/reproducing device 100 can record high-speed captured image to be easily managed.

Still further, the image recording/reproducing device 100 generates a folder structure of the HIGHRATE main folder 220 in association with a folder structure of the BDMV main folder 210. Thereby, a relationship between a normal content and an associated high-speed image sub-data can be easily traced. Still further, processing for designating the stream files 219 and 229 using the playlist files 217 and 227 via the clipinfo files 218 and 228 to reproduce the designated stream files 219 and 229, respectively, can be shared between the processing for a normal content and the processing for high-speed image sub-data. Thereby, implementation of the control unit 110 can be simplified.

Still further, if the HIGHRATE main folder 220 has the same backup folder 226 as that in the BDMV main folder 210, the file operation procedure for operating the backup folders during editing processing can be shared between the processing for a normal content and the processing for high-speed image sub-data.

Although the image recording/reproducing device 100 according to the embodiment of the present invention has been described as above, the present invention is not limited to the above.

It should be noted that it has been described in the above explanation that a single main folder regarding normal contents is associated with a single main folder regarding high-speed image sub-data, but the high-speed image sub-data may be divided into plural pieces which are recorded in respective different main folders.

It should also be noted that it has been described in the above explanation that image in conformity to a conventional standard has a frame rate of 30 fps, but image in conformity to a conventional standard may have any other frame rate except the frame rate of 30 fps. For example, image in conformity to a conventional standard may have a frame rate of 60 fps.

It should also be noted that it has been described in the above explanation that the high-speed captured image has a frame rate of 300 fields per second, but the frame rate of the high-speed captured image is not limited to the above and may be any frame rate higher than the frame rate of the conventional standard.

It should also be noted that it has been described in the above explanation that in FIG. 11 the image recording/reproducing device 100 determines whether or not a reproduction mode is the high-speed reproduction mode (S200) and then determines whether or not the high-speed image sub-data exists (S201), but it is also possible that the image recording/reproducing device 100 firstly determines whether or not the high-speed image sub-data exists (S201) and then determines whether or not a reproduction mode is the high-speed reproduction mode (S200). Furthermore, the image recording/reproducing device 100 may perform the determination as to whether or not a reproduction mode is the high-speed reproduction mode (S200) per a predetermined time period.

It should also be noted that the folder structure shown in FIG. 10 is used in the above explanation, but the present invention is not limited to the above as far as (i) image equivalent to image having a frame rate of 30 fps and (i) the other image are stored in respective different folders. In other words, the present invention is not limited as far as the playlist file 217, the clipinfo file 218, and the stream file 219 are recorded in the BDMV main folder 210 or in folders below the BDMV main folder 210 in a hierarchical structure. In addition, the playlist file 227, the clipinfo file 228, and the stream file 229 are recorded in the HIGHRATE main folder 220 or in folders below the HIGHRATE main folder 220 in a hierarchical structure.

It should also be noted that substance of the information included in each of the playlist file 217, the clipinfo file 218, and the stream file 219 is not necessarily stored in the BDMV main folder 210. It is also possible that only information for specifying the substance of the information included in each of the playlist file 217, the clipinfo file 218, and the stream file 219 is stored in the BDMV main folder 210. In other words, the present invention is not limited as far as the playlist file 217, the clipinfo file 218, and the stream file 219 are recorded in association with the BDMV main folder 210.

Likewise, substance of the information included in each of the playlist file 227, the clipinfo file 228, and the stream file 229 are not necessarily stored in the HIGHRATE main folder 220. It is also possible that only information for specifying the substance of the information included in each of the playlist file 227, the clipinfo file 228, and the stream file 229 is stored in the HIGHRATE main folder 220. In other words, the present invention is not limited as far as the playlist file 227, the clipinfo file 228, and the stream file 229 are recorded in association with the HIGHRATE main folder 220.

It should also be note that it has been described in the above description that the image recording/reproducing device 100 has both of a recording function of recording captured image data to the recording medium 200 and a reproduction function of reproducing the image data recorded on the recording medium 200, but the present invention may be implemented as an image recording device having only the recording function of the image recording/reproducing device 100 or an image reproducing device having only the reproduction function of the image recording/reproducing device 100.

It should also be note that the image recording/reproducing device 100 according to the present invention may further include a Central Processing Unit (CPU), a Large Scale Integrated Circuit (LSI), a Random Access Memory (RAM), a Read Only Memory (ROM), a Hard Disk Drive (HDD), a network interface, and the like. The image recording/reproducing device 100 may still further include a drive device that can read from and write to a portable recording medium, such as a DVD-RAM, a BD, or a Secure Digital (SD) card.

It should also be note that the image recording/reproducing device 100 may be implemented as a system embedded in a digital video camera, a digital camera, a digital recorder, a digital television set, a game machine, an Internet Protocol (IP) telephone, a portable telephone, or the like.

It is also possible that a program for controlling the image recording/reproducing device 100 (hereinafter, referred to as a "recording/reproducing program") is installed in a HDD, a ROM, or the like and executed to achieve a part or all of the functions of the image recording/reproducing device 100.

Here, the recording/reproducing program may be recorded to a computer-readable recording medium that is readable for a hardware system such as a computer system or an embedded system. It is also possible that the recording/reproducing program is read from the recording medium to another hardware system and then executed. Thereby, each function of the image recording/reproducing device 100 can be implemented in the hardware system. Here, examples of the computer-readable recording medium are an optical recording medium such as a CD-ROM, a magnetic recording medium such as a hard disk, a magnetooptical recording medium such as a MO, and a semiconductor memory such as a memory card.

Further, the recording/reproducing program may be held in a hardware system connected to a network such as the Internet or a local area network. Furthermore, the recording/reproducing program may be downloaded from a network to a hardware system and then executed. Thereby, each function of the image recording/reproducing device 100 can be implemented in the hardware system. Here, examples of the network are a terrestrial broadcasting network, a satellite broadcasting network, a Power Line Communication (PLC), a mobile telephone network, a wire communication network such as IEEE802.3, and a wireless communication network such as IEEE802.11.

It should be noted that a part or all of the functions of the image recording/reproducing device 100 may be implemented as a recording/reproducing circuit (hardware) embedded in the image recording/reproducing device 100.

It should be noted that the recording/reproducing circuit may be formed in at least one of a semi custom LSI such as a full custom LSI or an Application Specific Integrated Circuit (ASIC), a programmable logic device, and a dynamic reconfigurable device in which a circuit configuration is dynamically rewritable. Here, examples of the programmable logic device are a Field Programmable Gate Array (FRGA) and a Complex Programmable Logic Device (CPLD).

Moreover, design data for forming each function of the image recording/reproducing device 100 in the recording/reproducing circuit may be a program described in a hardware description language (hereinafter, referred to as a "HDL program"). The design data may be a netlist at a gate level obtained by performing logic synthesis on the HDL program. The design data may be macro-cell information in which the netlist at a gate level is added with arrangement information, process conditions, and the like. The design data may be mask data defining a size, timing, and the like. Here, examples of the hardware description language are a Very high speed integrated circuit Hardware Description Language (VHDL), a Verilog-HDL, and a System C.

It is also possible that the design data is recorded on a computer-readable recording medium that is readable for a hardware system such as a computer system or an embedded system. The recording/reproducing program may be read from the recording medium to another hardware system and then executed. Then, the design data read from the recording medium to another hardware system may be downloaded to a programmable logic device via a download cable.

The design data may be held in a hardware system connected to a network such as the Internet or a local area network. Furthermore, the design data may be downloaded from a network to another hardware system and then executed. Then, the design data provided to another hardware system via a network may be downloaded to a programmable logic device via a download cable.

Or, the design data may be recorded on a serial ROM so that the design data can be transmitted to a FPGA when applying current. The design data recorded on the serial ROM may be downloaded directly to the FPGA when applying current.

Or, the design data may be generated by a microprocessor and downloaded to a FPGA when applying current.

Although only the exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

INDUSTRIAL APPLICABILITY

The present invention can be used as an image recording device, an image reproducing device, and a recording medium. More specifically, the present invention can be used as an image recording/reproducing device, such as a digital video camera, a digital camera, a digital recorder, a digital television set, a game machine, an IP telephone, or a portable telephone, which records and reproduces high-speed captured image. Or, the present invention can be used as a recording medium in which the high-speed captured image is recorded by the image recording/reproducing device.

What is claimed is:

1. An image recording device that compresses a captured image and records the captured image to a recording medium, the captured image being captured at a second frame rate higher than a first frame rate, and the recording medium being removable from said image recording device, said image recording device comprising:
a reference clock generation unit configured to generate a reference clock;
a first compression unit configured to generate first compressed image data by compressing a first picture that is included in pictures in the captured image and that is equivalent to the image captured at the first frame rate;
a second compression unit configured to generate second compressed image data by compressing a second picture that is included in the pictures in the captured image except the first picture;
a first timestamp generation unit configured to generate a first timestamp indicating a time for presentation of the first picture with reference to the reference clock;
a second timestamp generation unit configured to generate a second timestamp indicating a time for presentation of the second picture with reference to the reference clock;
a first assignment unit configured to assign the first timestamp to the first compressed image data;
a second assignment unit configured to assign the second timestamp to the second compressed image data; and
a recording unit configured to record, to the recording medium, (i) the first compressed image data assigned with the first timestamp by said first assignment unit and (ii) the second compressed image data assigned with the second timestamp by said second assignment unit.

2. The image recording device according to claim 1,
wherein said first timestamp generation unit is configured to generate a plurality of first timestamps including the first timestamp for a plurality of first pictures including the first picture which are consecutive, the plurality of first timestamps being generated at regular intervals, and
said second timestamp generation unit is configured to generate a plurality of second timestamps including the second timestamp for a plurality of second pictures including the second picture which are consecutive, the plurality of second timestamps being generated at irregular intervals.

3. The image recording device according to claim 2,
wherein said first timestamp generation unit and said second timestamp generation unit are configured to generate the plurality of first timestamps and the plurality of second timestamps, respectively, so that the plurality of first timestamps and the plurality of second timestamps which are consecutive are arranged at regular intervals in an order of time.

4. The image recording device according to claim 1,
wherein the recording medium is initialized to have a file system, and
said recording unit is configured to (i) create a first folder and a second folder in the file system, (ii-1) record the first compressed image data and first control information for reproducing the first compressed image data in association with the first folder, and (ii-2) record the second compressed image data in association with the second folder.

5. An image reproducing device that reproduces a captured image recorded on a recording medium, the captured image being captured at a second frame rate higher than a first frame rate, and the recording medium being removable from said image reproducing device, said image reproducing device comprising:
a readout unit configured to read out first compressed image data and second compressed image data to be recorded to the recording medium, the first compressed image data being generated by compressing a first picture that is included in pictures in the the captured image and that is equivalent to image captured at the first frame rate, and the second compressed image being generated by compressing a second picture that is included in the pictures in the captured image except the first picture;
a first decompression unit configured to reconstruct the first picture by decompressing the first compressed image data;

a second decompression unit configured to reconstruct the second picture by decompressing the second compressed image data;

a first timestamp obtainment unit configured to obtain a first timestamp assigned to the first compressed image data to indicate a time for presentation of the first picture;

a second timestamp obtainment unit configured to obtain a second timestamp assigned to the second compressed image data to indicate a time for presentation of the second picture; and a reproduction unit configured to reproduce the first picture and the second picture in an order decided based on the first timestamp and the second timestamp.

6. The image reproducing device according to claim 5, further comprising a reference clock counter unit configured to count a reference clock based on information of the reference clock, the information being added to the first compressed image data, wherein said reproduction unit is configured to reproduce (i) the first picture at a timing where the first timestamp corresponds to a corresponding timing of the reference clock, and (ii) the second picture at a timing where the second timestamp corresponds to a corresponding timing of the reference clock.

7. The image reproducing device according to claim 6, wherein said image reproducing device has a first mode and a second mode, the first mode being used for reproducing, at the first frame rate, the captured image captured at the first frame rate and recorded to the recording medium, and the second mode being used for reproducing, at a third frame rate slower than the second frame rate, the captured image captured at the second frame rate and recorded to the recording medium, and said reference clock counter unit is configured to (i), at the first mode, count the reference clock having a first frequency based on the information of the reference clock, and (ii), at the second mode, count the reference clock having a second frequency lower than the first frequency based on the information of the reference clock.

8. The image reproducing device according to claim 5, wherein said image reproducing device has a first mode and a second mode, the first mode being used for reproducing, at the first frame rate, the captured image captured at the first frame rate and recorded to the recording medium, and the second mode being used for reproducing, at a third frame rate slower than the second frame rate, the captured image captured at the second frame rate and recorded to the recording medium, and said reproduction unit is configured to (i) sort, at the second mode, the first picture and the second picture in an order decided based on the first timestamp and the second timestamp and (ii) sequentially reproduce the first picture and the second picture in the order at timings indicated by pulse signals provided from outside of said image reproducing device.

9. The image reproducing device according to claim 5, wherein the first timestamp and the second timestamp are generated with reference to a same reference clock.

10. A non-transitory recording medium on which a captured image is recorded, the captured image being captured at a second frame rate higher than a first frame rate, and said recording medium being removable from an image recording device and an image reproducing device, said non-transitory recording medium comprising:

first compressed image data generated by compressing a first picture that is included in pictures in the captured image and that is equivalent to the image captured at the first frame rate; and second compressed image data generated by compressing a second picture that is included in the pictures in the captured image except the first picture, wherein said first compressed image data is assigned with a first timestamp indicating a time for presentation of the first picture with reference to a reference clock, and said second compressed image data is assigned with a second timestamp indicating a time for presentation of the second picture with reference to the reference clock.

11. The recording medium according to claim 10, wherein a plurality of first timestamps including the first timestamp are generated at regular intervals, the plurality of first timestamps being assigned to a plurality of first pictures including the first picture which are consecutive, and a plurality of second timestamps including the second timestamp are generated at irregular intervals, the plurality of second timestamps being assigned to a plurality of second pictures including the second picture which are consecutive.

12. The recording medium according to claim 11, wherein the plurality of first timestamps and the plurality of second timestamps are arranged at regular intervals in an order of time.

13. The recording medium according to claim 10, wherein said recording medium is initialized to have a file system, a first folder and a second folder are created in the file system, said first compressed image data and first control information are recorded in association with the first folder, the first control information being used for reproducing the first compressed image data, and said second compressed image data is recorded in association with the second folder.

14. An image recording method used in an image recording device that compresses a captured image and records the captured image to a recording medium, the captured image being captured at a second frame rate higher than a first frame rate, and the recording medium being removable from the image recording device, said image recording method comprising:

generating a reference clock;

generating first compressed image data by compressing a first picture that is included in pictures in the captured image and that is equivalent to the image captured at the first frame rate;

generating second compressed image data by compressing a second picture that is included in the pictures in the captured image except the first picture;

generating a first timestamp indicating a time for presentation of the first picture with reference to the reference clock;

generating a second timestamp indicating a time for presentation of the second picture with reference to the reference clock;

assigning the first timestamp to the first compressed image data;

assigning the second timestamp to the second compressed image data; and recording, to the recording medium, (i) the first compressed image data assigned with the first timestamp by said assigning of the first timestamp and (ii) the second compressed image data assigned with the second timestamp by said assigning of the second timestamp.

15. A non-transitory computer-readable recording medium having a program for implementing an image recording method used in an image recording device that compresses a captured image and records the captured image to a recording medium, the captured image being captured at a second frame rate higher than a first frame rate, and the recording medium being removable from the image recording device, said program causing a computer to execute:

generating a reference clock;

generating first compressed image data by compressing a first picture that is included in pictures in the captured image and that is equivalent to the image captured at the first frame rate;

generating second compressed image data by compressing a second picture that is included in the pictures in the captured image except the first picture;

generating a first timestamp indicating a time for presentation of the first picture with reference to the reference clock;

generating a second timestamp indicating a time for presentation of the second picture with reference to the reference clock;

assigning the first timestamp to the first compressed image data;

assigning the second timestamp to the second compressed image data; and recording, to the recording medium, (i) the first compressed image data assigned with the first timestamp by said assigning of the first timestamp and (ii) the second compressed image data assigned with the second timestamp by said assigning of the second timestamp.

16. A camera that compresses a captured image and records the captured image to a recording medium, the captured image being captured at a second frame rate higher than a first frame rate, and the recording medium being removable from said camera, said camera comprising:

an imaging element converting incident light signals to electric signals;

an image signal processing unit configured to generate signals of the captured image at the second frame rate, from the electric signals converted by the imaging element;

a reference clock generation unit configured to generate a reference clock;

a first compression unit configured to generate first compressed image data by compressing a first picture that is included in pictures in the captured image and that is equivalent to the image captured at the first frame rate;

a second compression unit configured to generate second compressed image data by compressing a second picture that is included in the pictures in the captured image except the first picture;

a first timestamp generation unit configured to generate a first timestamp indicating a time for presentation of the first picture with reference to the reference clock;

a second timestamp generation unit configured to generate a second timestamp indicating a time for presentation of the second picture with reference to the reference clock;

a first assignment unit configured to assign the first timestamp to the first compressed image data;

a second assignment unit configured to assign the second timestamp to the second compressed image data; and a recording unit configured to record, to the recording medium, (i) the first compressed image data assigned with the first timestamp by said first assignment unit and (ii) the second compressed image data assigned with the second timestamp by said second assignment unit.

* * * * *

UNITED STATES PATENT AND TRADEMARK OFFICE
CERTIFICATE OF CORRECTION

| | | |
|---|---|---|
| PATENT NO. | : 8,018,502 B2 | Page 1 of 1 |
| APPLICATION NO. | : 12/358480 | |
| DATED | : September 13, 2011 | |
| INVENTOR(S) | : Hiroaki Shimazaki et al. | |

It is certified that error appears in the above-identified patent and that said Letters Patent is hereby corrected as shown below:

Title Page, Item 54 and Col. 1, lines 1-7

The Title of the invention should read as follows:

--IMAGE RECORDING DEVICE, IMAGING REPRODUCING DEVICE, RECORDING MEDIUM, AND IMAGE RECORDING METHOD FOR CAPTURING IMAGES AT DIFFERENT FRAME RATES AND GENERATING TIME STAMPS FOR PRESENTATION--

Signed and Sealed this
Sixth Day of December, 2011

David J. Kappos
*Director of the United States Patent and Trademark Office*